United States Patent
Nakagawa et al.

(10) Patent No.: US 10,647,115 B2
(45) Date of Patent: May 12, 2020

(54) RECORDING APPARATUS AND RECORDING METHOD

(71) Applicant: CANON KABUSHIKI KAISHA, Tokyo (JP)

(72) Inventors: Junichi Nakagawa, Tokyo (JP); Yoshikazu Ishikawa, Yokohama (JP); Akitoshi Yamada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/122,114

(22) Filed: Sep. 5, 2018

(65) Prior Publication Data

US 2019/0070851 A1 Mar. 7, 2019

(30) Foreign Application Priority Data

Sep. 7, 2017 (JP) ................................ 2017-172024

(51) Int. Cl.
- *B41J 2/135* (2006.01)
- *H04N 1/40* (2006.01)
- *H04N 1/032* (2006.01)
- *B41J 2/51* (2006.01)
- *H04N 1/405* (2006.01)

(52) U.S. Cl.
CPC ............ *B41J 2/135* (2013.01); *B41J 2/51* (2013.01); *H04N 1/0323* (2013.01); *H04N 1/40* (2013.01); *H04N 1/4051* (2013.01)

(58) Field of Classification Search
CPC ..... B41J 2/135; B41J 2/51; B41J 2/145; B41J 2/155; B41J 2/2132; H04N 1/0323; H04N 1/40; H04N 1/4051
See application file for complete search history.

(56) References Cited

U.S. PATENT DOCUMENTS 6,641,251 B1 * 11/2003 Rodriguez ...................... 347/40

FOREIGN PATENT DOCUMENTS

JP H10-044519 A 2/1998

OTHER PUBLICATIONS

Theophano Mitsa and Kevin J. Parker—"Digital halftoning using a blue noise mask"; Electrical Engineering Department, University of Rochester, Rochester, NY 14627; Proc. SPIE vol. 1452, pp. 47-56; Image Processing Algorithms and Techniques II (1991).

Robert Ulichney—"The void-and-cluster method for dither array generation"; Digital Equipment Corporation, Maynard, MA 01754-2571; Proceedings SPIE vol. 1913, pp. 332-343 (1993).

* cited by examiner

*Primary Examiner* — Juanita D Jackson

(74) *Attorney, Agent, or Firm* — Canon U.S.A., Inc. IP Division

(57) ABSTRACT

Quantization is performed on multi-valued data corresponding to a non-overlap recording area and one of recording heads on the basis of a dither pattern and multi-valued data corresponding to the non-overlap recording area and the other one of the recording heads, and also arrangements of thresholds for the dither patterns used between the scanning operations are varied.

13 Claims, 17 Drawing Sheets

FIG. 7A
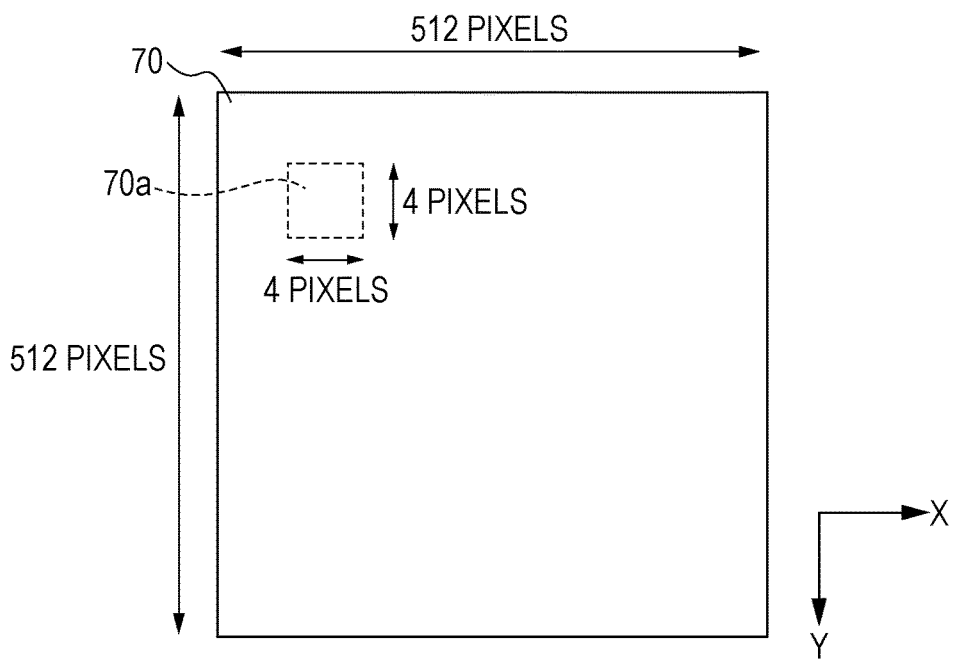
FIG. 7B
FIG. 7C
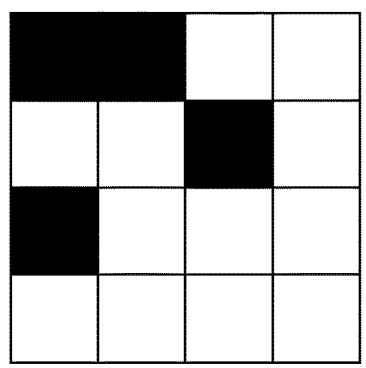
FIG. 7D
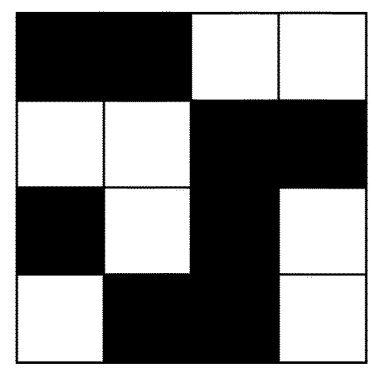

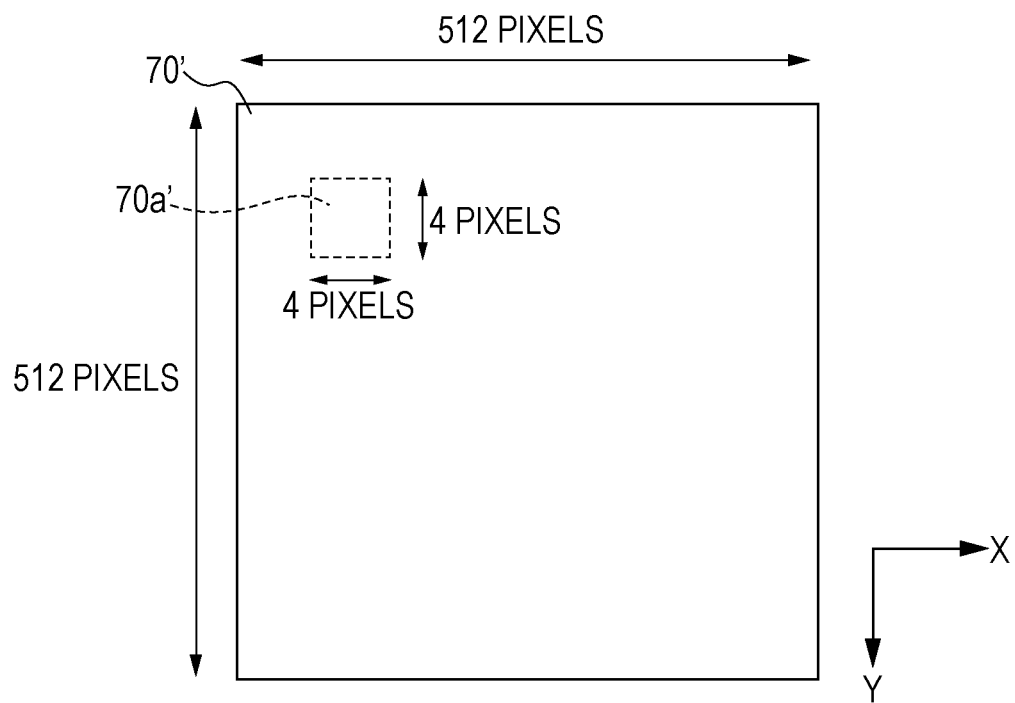

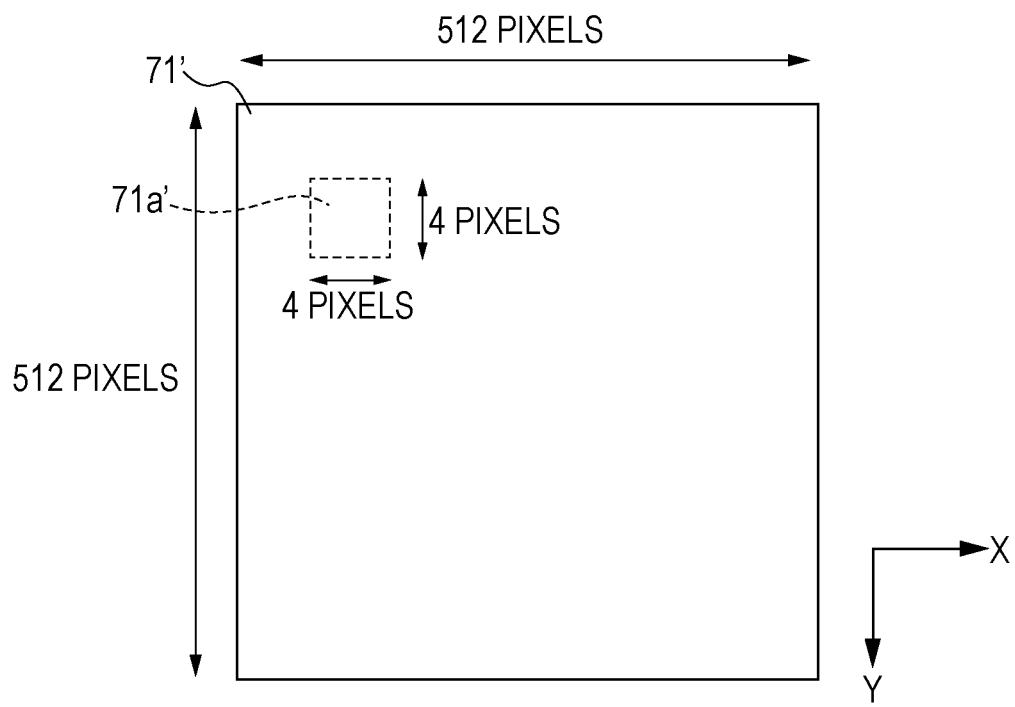

FIG. 13A
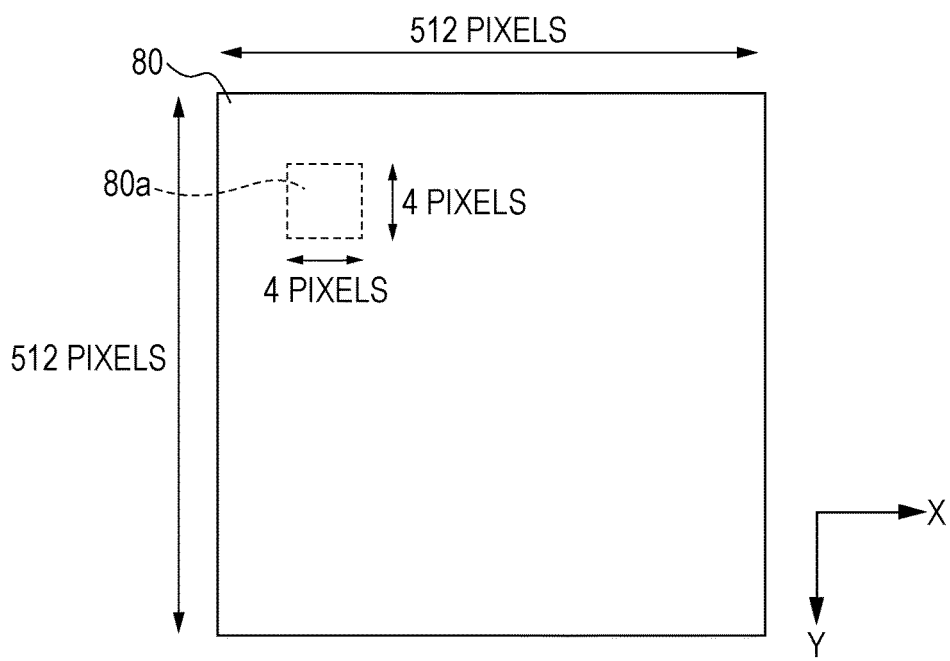
FIG. 13B
FIG. 13C 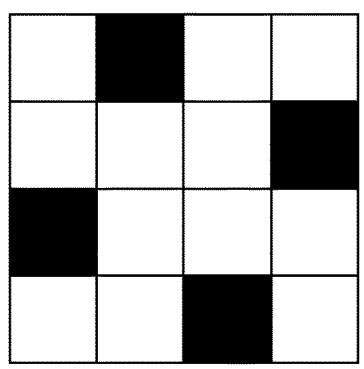 FIG. 13D 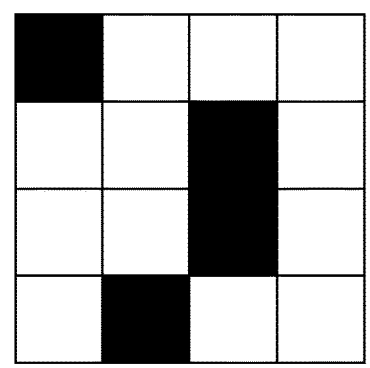

FIG. 14A
FIG. 14B
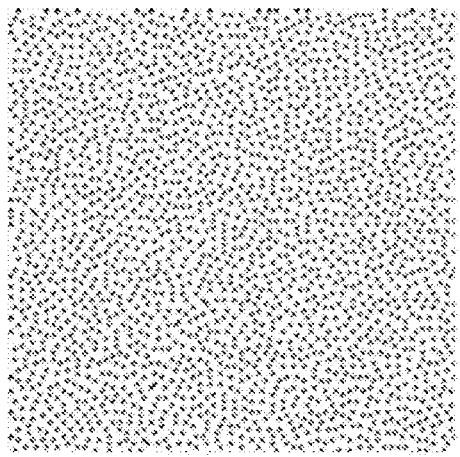
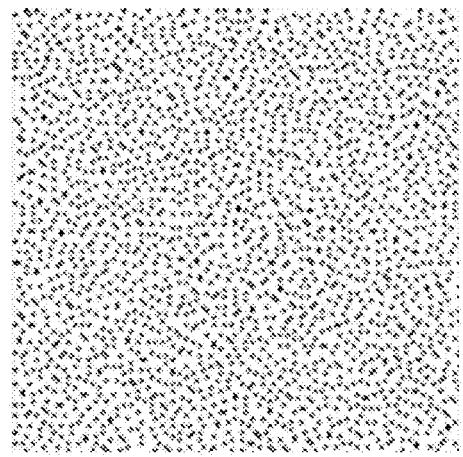
FIG. 14C
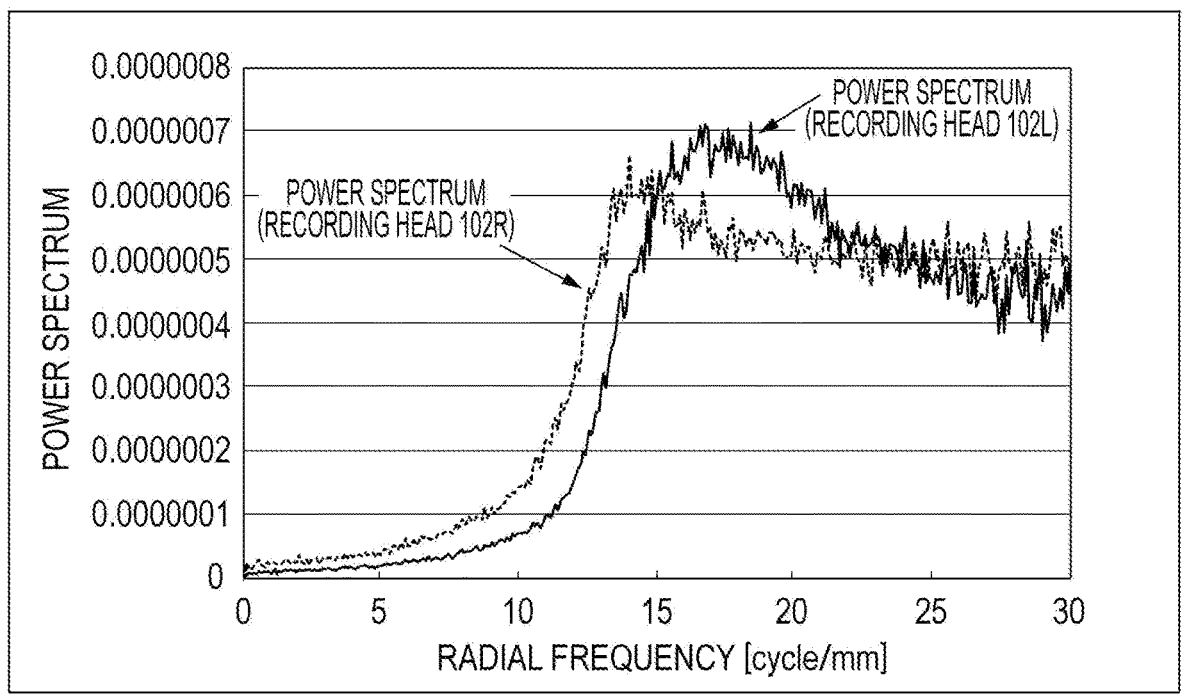

RECORDING APPARATUS AND RECORDING METHOD

BACKGROUND OF THE INVENTION

Field of the Invention

The present invention relates to a recording apparatus and a recording method.

Description of the Related Art

A recording apparatus has been proposed which records an image by ejecting ink while a recording unit having an ejection nozzle array in which a plurality of ejection nozzles for ejecting the ink are arranged is scanned multiple times with respect to a unit area of a recording medium.

In the above-described recording apparatus, shortening of a recording time with respect to the recording medium has been demanded up to now. To achieve the above-described shortening of the recording time, Japanese Patent Laid-Open No. 10-044519 describes a use of a recording unit including one piece each of a recording unit provided with a plurality of ejection nozzle arrays for ejecting ink of a plurality of colors respectively on a left side and a right side of a scanning direction as the recording unit, According to Japanese Patent Laid-Open No. 10-044519, the above-described recording unit is used, and dots are formed while the ink is ejected only from the recording unit on the left side in an area on the left side in the scanning direction on the recording medium and the ink is ejected only from the recording unit on the right side in an area on the right side in the scanning direction. With this configuration, since the recording can be completed without scanning an entire area by the recording unit from a position opposite to a left side end on the recording medium to a position opposite to a right side end, the recording time can be shortened.

When the above-described recording unit is used, in a case where a difference in ejection characteristics is generated in the two recording units, a density difference is caused in the area recorded by the recording unit on the left side on the recording medium and the area recorded by the recording unit on the right side. In a case where the recording is performed by only one of the recording unit on the left side and the recording unit on the right side with respect to the entire area in the scanning direction on the recording medium, there is a fear that an image quality of an image obtained at a boundary between the area recorded by the recording unit on the left side and the area recorded by the recording unit on the right side may be decreased due to this density difference. In view of the above-described point, according to Japanese Patent Laid-Open No. 10-044519, both the recording unit on the left side and the recording unit on the right side distribute (share or overlap) tasks and perform the recording with respect to a central part in the scanning direction on the recording medium to suppress the above-described decrease in the image equality.

Herein, in a case where the recording is performed by using the above-described recording unit, when an arrangement of dots formed in an area where the left and right recording units perform the overlap recording (hereinafter, which will be referred to as an overlap recording area) and an arrangement of dots formed in an area where only one of the left and right recording units performs the recording (hereinafter, which will be referred to as a non-overlap recording area) are different from each other, there is a fear that the image quality may be decreased. When the dot arrangement differs between the adjacent overlap recording area and non-overlap recording area, granular impression and uniformity differ between those areas, which causes the decrease in the image quality.

On the other hand, in a case where the recording is performed by carrying out scanning multiple times with respect to the unit area, when the dots are formed at exclusive and also complementary positions by those multiple scanning operations, an image having the optimal image quality is meant to be obtained. However, in a case where a skew conveyance of the recording medium between the scanning operations or a deviation in ink ejecting positions is caused between the scanning operations due to a fluctuation in a speed of the recording head, an inclination, or the like, there is a fear that the image density is largely decreased when the dots are formed at the exclusive and also complementary positions. In particular, since the deviation in ink ejecting positions between the left and right recording units which is derived from a manufacturing error, an attachment error of the recording units, or the like may in addition to the above-described skew or fluctuation in the overlap recording area also be caused, the decrease in the image density becomes more conspicuous.

SUMMARY OF THE INVENTION

The present invention has been made in view of the above-described issues and aims at suppressing both the decrease in the image quality caused by the decrease in the granular impression and the uniformity between the overlap recording area and the non-overlap recording area and the decrease in the image quality caused by the decrease in the image density in the multiple scanning operations.

In view of the above, embodiments of the present invention provide a recording apparatus including:

a recording unit including a first recording unit having an ejection nozzle array in which a plurality of ejection nozzles for ejecting ink are arranged in a first direction and a second recording unit having an ejection nozzle array in which a plurality of ejection nozzles for ejecting the ink are arranged in the first direction, the second recording unit being arranged at a position away in a second direction intersecting with the first direction from a position where the first recording unit is arranged;

a scanning unit configured to scan the recording unit multiple times in the second direction with respect to a unit area on a recording medium, the unit area including a first area where an image is recorded by using the first recording unit without using the second recording unit and a second area, which is adjacent to the first area in the second direction, where the image is recorded by using both the first recording unit and the second recording unit;

an obtaining unit configured to obtain multi-valued data corresponding to a recording operation onto the unit area by the recording unit;

a generation unit configured to generate recording data for setting ejection or non-ejection of the ink by quantizing the multi-valued data obtained by the obtaining unit by using a plurality of dither patterns in which thresholds for setting ejection or non-ejection of the ink with respect to respective pixels in the unit area are set for the respective pixels; and a control unit configured to control the recording operation by the recording unit in a manner that the ink is ejected to the unit area on a basis of the recording data generated by the generation unit, wherein the obtaining unit obtains first multi-valued data corresponding to a first recording operation by the first recording unit with respect to the first area in a first scanning among the multiple scanning operations, second multi-valued data corresponding to a second recording operation by the first recording unit with respect to the second area in the first scanning, third multi-valued data corresponding to a third recording operation by the second recording unit with respect to the second area in the first scanning, fourth multi-valued data corresponding to a fourth recording operation by the first recording unit with respect to the first area in a second scanning different from the first scanning, fifth multi-valued data corresponding to a fifth recording operation by the first recording unit with respect to the second area in the second scanning, and sixth multi-valued data corresponding to a sixth recording operation by the second recording unit with respect to the second area in the second scanning, wherein the generation unit generates first recording data for setting the ejection of the ink in the first recording operation on a basis of the first multi-valued data and a first dither pattern among the plurality of dither patterns, generates second recording data for setting the ejection of the ink in the second recording on a basis of the second multi-valued data and the first dither pattern, generates third recording data for setting the ejection of the ink in the third recording operation on a basis of the second multi-valued data, the third multi-valued data, and the first dither pattern, generates fourth recording data for setting the ejection of the ink in the fourth recording operation on a basis of the fourth multi-valued data and a second dither pattern among the plurality of dither patterns, fifth recording data for setting the ejection of the ink in the fifth recording operation on a basis of the fifth multi-valued data and the second dither pattern, and sixth recording data for setting the ejection of the ink in the sixth recording operation on a basis of the fifth multi-valued data, the sixth multi-valued data, and the second dither pattern, and wherein an arrangement of thresholds for the respective pixels in the first dither pattern is different from an arrangement of thresholds for the respective pixels in the second dither pattern.

Further features of the present invention will become apparent from the following description of exemplary embodiments with reference to the attached drawings.

BRIEF DESCRIPTION OF THE DRAWINGS

FIGS. 7A to 7D are explanatory diagrams for describing a dither pattern according to the exemplary embodiment.

FIGS. 8A, 8B1 and 8B2, 8C1 to 8C4, and 8D1 to 8D8 are explanatory diagrams for describing distribution processing and quantization processing according to the exemplary embodiment.

FIGS. 10A. and 10B are explanatory diagrams for describing subtraction processing of the dither pattern according to the exemplary embodiment.

FIGS. 12A and 12B are explanatory diagrams for describing the subtraction processing of the dither pattern according to the exemplary embodiment.

FIGS. 13A to 13D are explanatory diagrams for describing the dither patterns according to the exemplary embodiment.

FIGS. 14A to 14C illustrate a dot arrangement and a spatial frequency characteristic thereof according to the exemplary embodiment.

FIGS. 17A to 17D are explanatory diagrams for describing the dither patterns according to the exemplary embodiment.

DESCRIPTION OF THE EMBODIMENTS

First Exemplary Embodiment

Hereinafter, a first exemplary embodiment of the present invention will be described in detail with reference to the drawings.

Figure 1:
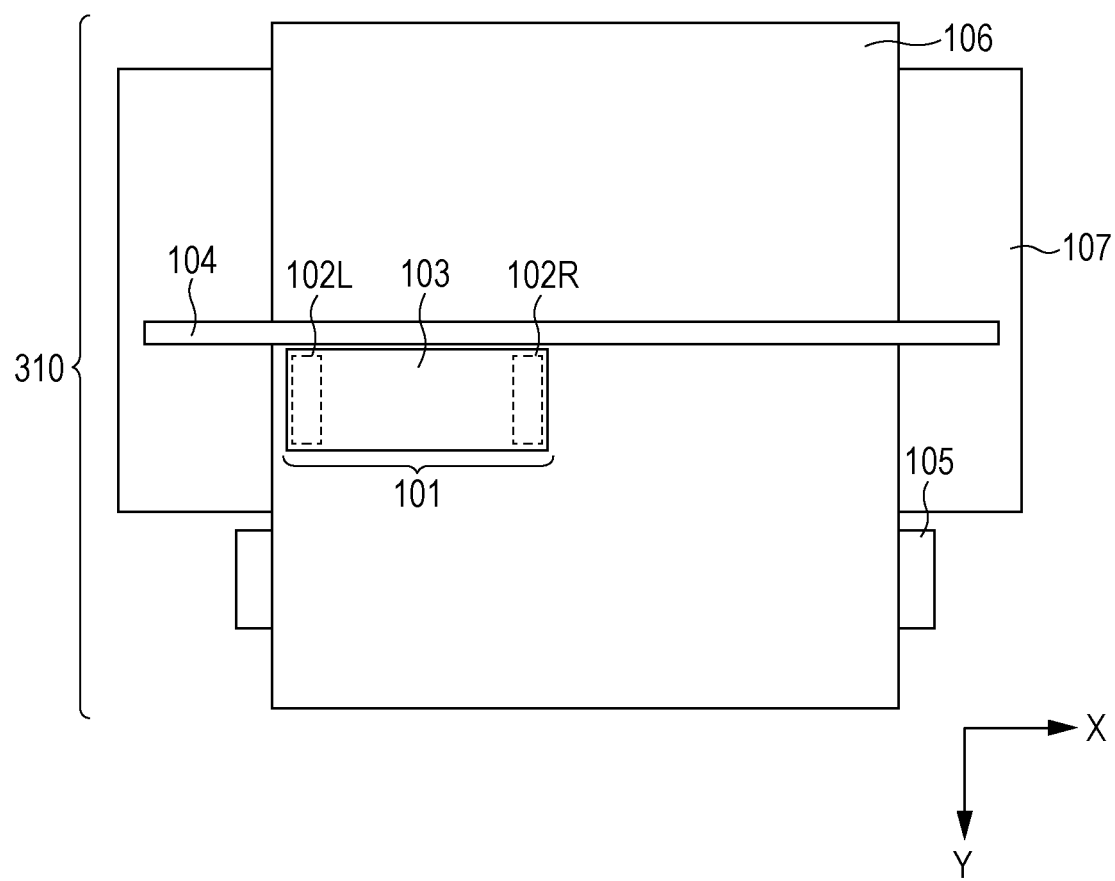
FIG. 1 is a schematic diagram illustrating an internal configuration of a recording apparatus according to an exemplary embodiment.

FIG. 1 is a schematic diagram illustrating an internal configuration of an inkjet recording apparatus 310 according to the present exemplary embodiment.

The inkjet recording apparatus according to the present exemplary embodiment (hereinafter, which will be also referred to as a printer or a recording apparatus) 310 is provided with a recording unit 101. The recording unit 101 includes a recording head 102L and a recording head 102R, and the recording heads 102L and 102R are held by a single holding part 103. Each of the recording heads 102L and 102R is provided with an ejection nozzle array for ejecting black ink, an ejection nozzle array for ejecting cyan ink, an ejection nozzle array for ejecting magenta ink, and an ejection nozzle array for ejecting yellow ink. A detail thereof will be described below.

The recording unit 101 can relatively perform reciprocal movement (scanning) in the X direction (second direction, scanning direction) along a guide rail 104 provided while extending in an X direction with respect to a recording medium. A recording medium 106 is supported by a platen 107 and conveyed in a Y direction (first direction, array direction, conveyance direction) while a conveyance roller 105 is rotated. Since the inkjet recording apparatus 310 according to the present exemplary embodiment repeatedly performs a recording operation accompanying the above-described scanning of the recording unit 101 in the X direction and a conveyance operation of the recording medium 106 in the Y direction by the conveyance roller 105, the recording with respect to the entire area of the recording medium 106 is completed.

Figure 2A:
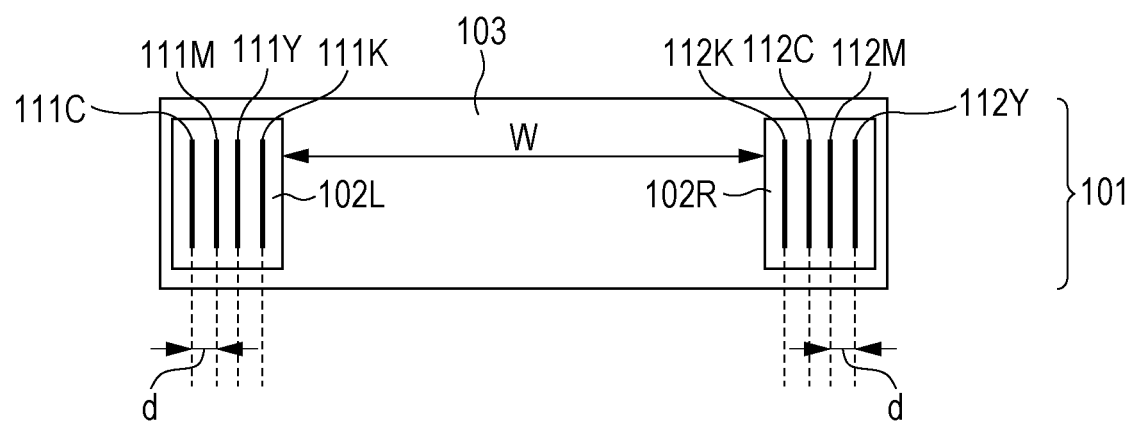
FIGS. 2A and 2B illustrate recording units according to the exemplary embodiment.
Figure 2B:
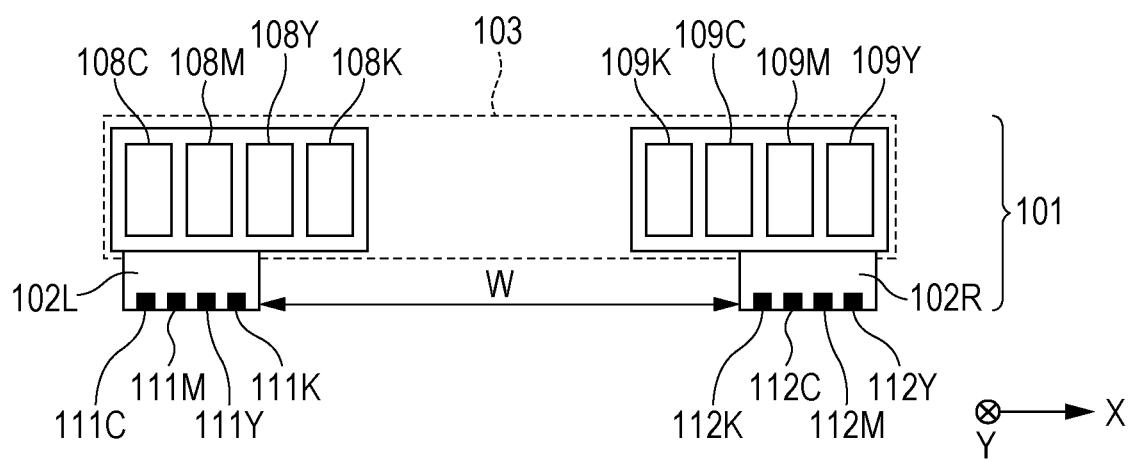

FIGS. 2A and 2B illustrate a detail of the recording unit 101 used according to the present exemplary embodiment. It should be noted that FIG. 2A is a schematic diagram of the recording unit 101 as viewed from the bottom in a vertical direction with respect to an XY plane. FIG. 2B is a schematic diagram of the recording unit 101 as viewed from the Y direction.

The recording head 102L and the recording head 102R are arranged in the recording unit 101 according to the present exemplary embodiment while being away from each other by a distance W in the X direction. In the recording head 102L, four ejection nozzle arrays 111C, 111M, 111Y, and 111K are arranged from the left side in the X direction in the stated order of the ejection nozzle array 111C for ejecting the cyan ink, the ejection nozzle array 111M for ejecting the magenta ink, the ejection nozzle array 111Y for ejecting the yellow ink, and the ejection nozzle array 111K for ejecting the black ink. On the other hand, in the recording head 102R, four ejection nozzle arrays 112C, 112M, 112Y, and 112K are arranged from the left side in the X direction in the stated order of the ejection nozzle array 112K for ejecting the black ink, the ejection nozzle array 112C for ejecting the cyan ink, the ejection nozzle array 112M for ejecting the magenta ink, and the ejection nozzle array 112Y for ejecting the yellow ink. It should be noted that the respective ejection nozzles in the recording heads 102L and 102R are manufactured such that the ink is ejected at an ejection amount of 3 [ng].

Herein, the four ejection nozzle arrays 111C, 111M, 111Y, and 111K in the recording head 102L are arranged so as to be apart from each other by a same distance d. Similarly, the four ejection nozzle arrays 112C, 112M, 112Y, and 112K in the recording head 102R are also arranged so as to be apart from each other by the same distance d. A plurality of ejection nozzles (not illustrated) for ejecting the corresponding ink are arranged in the Y direction in each of the eight ejection nozzle arrays.

It should be noted that the array order of the respective ejection nozzle arrays in the X direction in each of the recording heads 102L and 102R may be other orders.

As may be understood from FIGS. 2A and 2B, the recording heads 102L and 102R are arranged at the same position in the Y direction and also arranged at positions away from each other in the X direction. It should be noted that the recording unit 101 in which the recording heads 102L and 102R are arranged at the same position in the Y direction has been described herein. However, the recording heads 102L and 102R may also be arranged at positions shifted in the Y direction from each other as long as recording areas in accordance with the ejection nozzle arrays for ejecting the ink of the respective colors with regard to the Y direction are partially overlapped with each other such that at least a part of an area on the recording medium can be recorded by the recording heads 102L and 102R by the same scanning.

Each of the ejection nozzles in the respective ejection nozzle arrays in the recording head 102L is connected to an ink tank that contains the corresponding ink via a path which is not illustrated in the drawing. In more detail, the ejection nozzles arranged in the ejection nozzle array 111C are connected to an ink tank 108C that stores the cyan ink, the ejection nozzles arranged in the ejection nozzle array 111M are connected to an ink tank 108M that stores the magenta ink, the ejection nozzles arranged in the ejection nozzle array 111Y are connected to an ink tank 108Y that stores the yellow ink, and the ejection nozzles arranged in the ejection nozzle array 111K are connected to an ink tank 108K that stores the black ink. Similarly, the ejection nozzles arranged in the ejection nozzle array 112C in the recording head 102R are connected to an ink tank 109C that stores the cyan ink, the ejection nozzles arranged in the ejection nozzle array 112M are connected to an ink tank 109M that stores the magenta ink, the ejection nozzles arranged in the ejection nozzle array 112Y are connected to an ink tank 109Y that stores the yellow ink, and the ejection nozzles arranged in the ejection nozzle array 112K are connected to an ink tank 109K that stores the black ink.

It should be noted that the mode in which the ejection nozzle array in the recording head 102L and the ejection nozzle array in the recording head 102R for ejecting the ink of the same color are connected to different ink tanks has been described here, but a configuration may also be adopted in which those ejection nozzle arrays are connected to the same single ink tank. In a case where the different ink tanks are used or a case where the same ink tank is used, the recording unit can be miniaturized when the ink tank is arranged such that the ink tank is positioned to be closer to a central side in the X direction of the holding part 103. However, when the miniaturization is not taken into account, for example, in a case where the two different ink tanks are used, a design may also be adopted in which central parts of the respective recording heads and ink tanks in the X direction are substantially matched with each other.

Left and Right Distribution Recording

Figure 3:
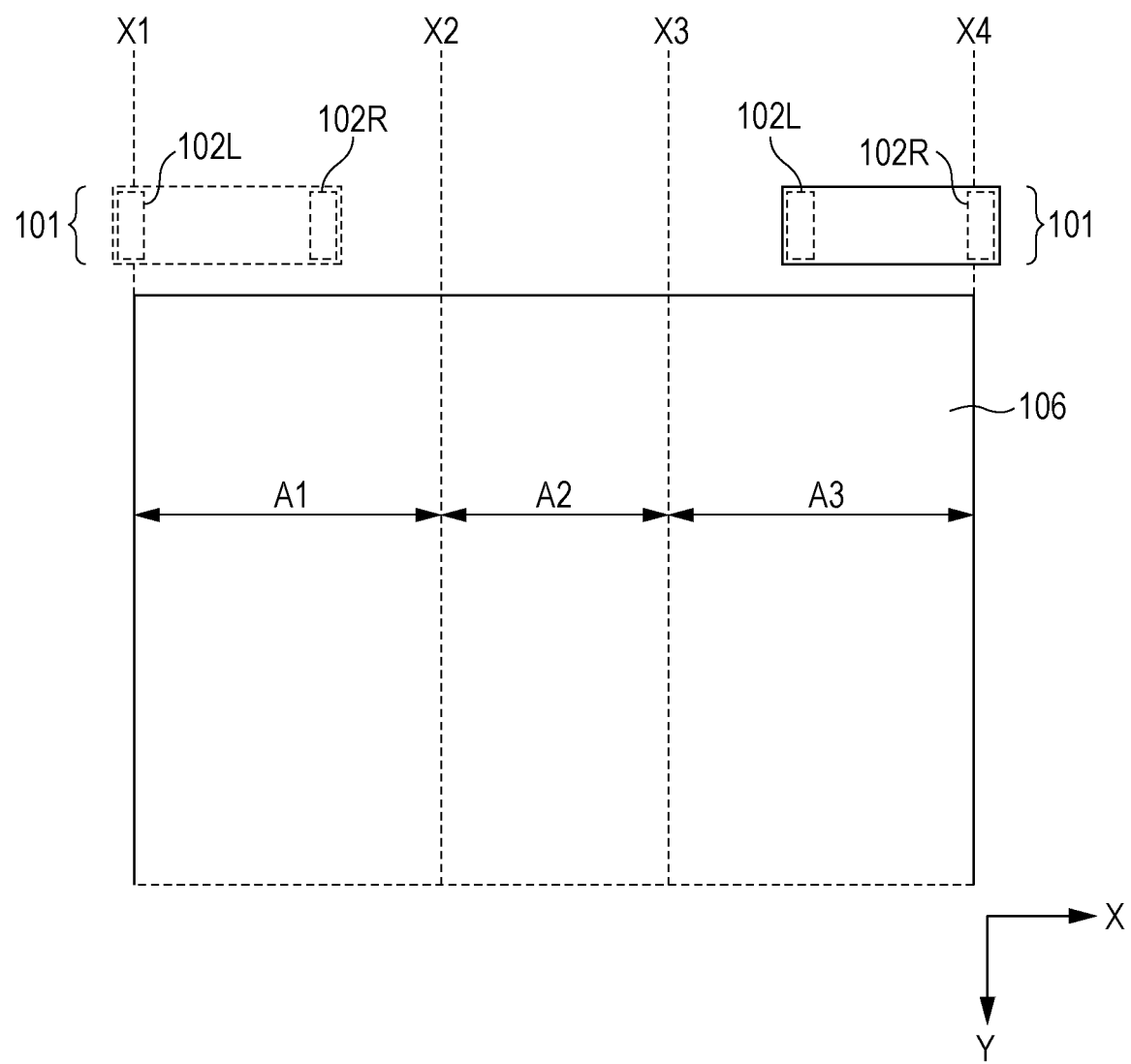
FIG. 3 is an explanatory diagram for describing a distribution recording method according to the exemplary embodiment.

FIG. 3 is a schematic diagram for describing a situation when the recording is performed on the recording medium 106 by using the recording unit 101. It should be noted that the recording unit 101 located on the left side in the X direction which is indicated by a broken line among the two recording units 101 illustrated in FIG. 3 corresponds to the position of the recording unit 101 at a timing when the recording with respect to the recording medium 106 is started in a case where the scanning is performed from the left side to the right side in the X direction. On the other hand, the recording unit 101 located on the right side in the X direction which is indicated by a solid line corresponds to the position of the recording unit 101 at a timing when the recording with respect to the recording medium 106 is ended in a case where the scanning is performed from the left side to the right side in the X direction.

In the following descriptions, an end position on the left side in the X direction of the recording medium 106 is indicated by a position X1, and an end position on the right side in the X direction of the recording medium 106 is indicated by a position X4. In addition, a predetermined position on the right side in the X direction with respect to the position X1 is indicated by a position X2, and a predetermined position on the left side in the X direction with respect to the position X4 is indicated by a position X3. While the positions X1 to X4 are defined as described above, an area on the left side in the X direction from the position X1 to the position X2 on the recording medium is indicated by an area A1, a central area in the X direction from the position X2 to the position X3 on the recording medium is indicated by an area A2, and an area on the right side in the X direction from the position X3 to the position X4 on the recording medium is indicated by an area A3.

The area A1 is an area where the ink is not ejected from the recording head 102R, and the recording is performed by only the ink ejection from the recording head 102L. The area A3 is an area where the ink is not ejected from the recording head 102L, and the recording is performed by only the ink ejection from the recording head 102R.

On the other hand, the area A2 is an area where the recording is performed in an overlap manner by the ink ejection from both of the recording heads 102L and 102R (overlap recording area). Therefore, according to the present exemplary embodiment, data corresponding to the area A2 is divided by performing recording head distribution processing which will be described below, and recording data to be used for the overlap recording with respect to the area A2 by using both the recording head 102R and the recording head 102L is generated.

As described above, according to the present exemplary embodiment, the recording medium 106 is divided into the three areas in the X direction, and the recording is performed while the different recording heads used for ejecting the ink are used for each of the three areas including the area A1, the area A2 adjacent to the area A1 in the X direction, and the area A3 adjacent to the area A2 in the X direction. In more detail, the recording is performed while the ink is ejected by only the recording head 102L in the area A1 on the left side in the X direction, the ink is ejected by only the recording head 102R in the area A3 on the right side in the X direction, and the ink is ejected by both the recording heads 102L and 102R in the area A2 in the center in the X direction.

Multi-pass Recording

Figure 4:
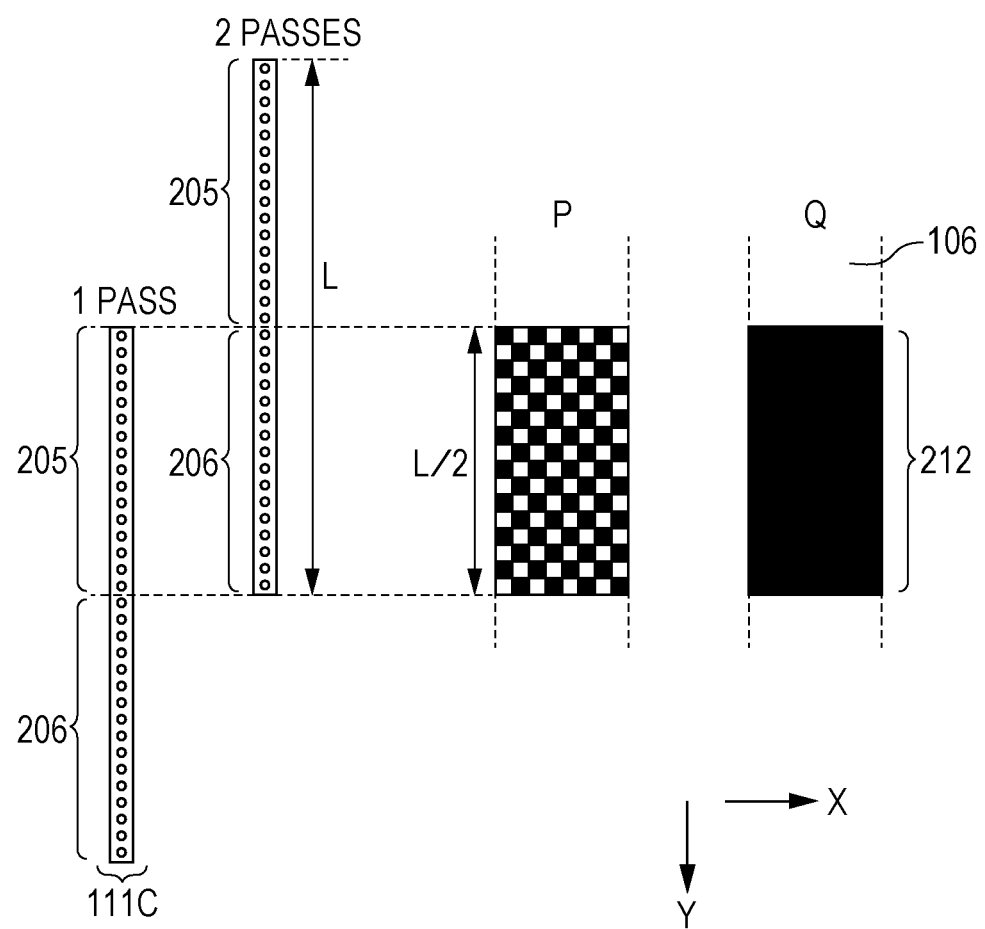
FIG. 4 is an explanatory diagram for describing a multi-pass recording method according to the exemplary embodiment.

FIG. 4 schematically illustrates a procedure for performing the recording while the recording unit is scanned twice with respect to the unit area on the recording medium according to the present exemplary embodiment, which is so-called two-pass recording. Herein, FIG. 4 illustrates the procedure for performing the recording with respect to a unit area 212 on the recording medium at the time of the two-pass recording. It should be noted that, for simplicity, only one array of the ejection nozzle array 111C in the recording unit 101 will be described herein, and the ejection nozzle array 111C is constituted by 32 ejection nozzles for illustration.

The plurality of ejection nozzles in the ejection nozzle array 111C are divided into two ejection nozzle groups 205 and 206 along the Y direction. The ink is ejected from the ejection nozzle group 205 in the first pass, and the ink is ejected from the ejection nozzle group 206 in the second pass with respect to the unit area 212. For this reason, in a case where a length in the Y direction of the ejection nozzle array 111C is set as L, the unit area 212 at the time of the two-pass recording in the Y direction has a length of one of the ejection nozzle groups 205 and 206 in the Y direction, that is, a length of L/2.

An example will be described below in which an image having a duty of 100% (hereinafter, which will be also referred to as a solid image) is formed on the recording medium. It should be noted that, in a case where the ink is applied once each to all of pixel areas equivalent to pixels existing in a certain area on the recording medium according to the present exemplary embodiment, the recording duty with respect to the area is defined as 100%.

In the first recording scanning, the ink is ejected from the ejection nozzle group 205 to the unit area 212 on the recording medium 106. As a result, the ink is ejected to pixel areas colored in black in P in FIGS. 7A to 7D in the unit area 212. Here, the recording is performed at the duty of 50%.

Next, the recording medium 106 is relatively conveyed from an upstream side to a downstream side in the Y direction with respect to the ejection nozzle array 111C by a distance of L/2. With this configuration, the ejection nozzle array 111O and the recording medium 106 have a positional relationship in which the ejection nozzle array 111C and the unit area 212 face each other.

Thereafter, the second recording scanning is performed. In the second recording scanning, the ink is ejected from the ejection nozzle group 206 to the unit area 212 on the recording medium. After the second recording scanning is performed, the ink is ejected to pixel areas colored in black in Q in FIGS. 7A to 7D in the unit area 212. Here, the recording is also performed at the duty of 50%.

As a result, after the second recording scanning is performed, the ink ejection to all the pixel areas is completed in the unit area 212 of the recording medium 106 as illustrated in Q, and the solid image is formed.

Recording Control System

Figure 5:
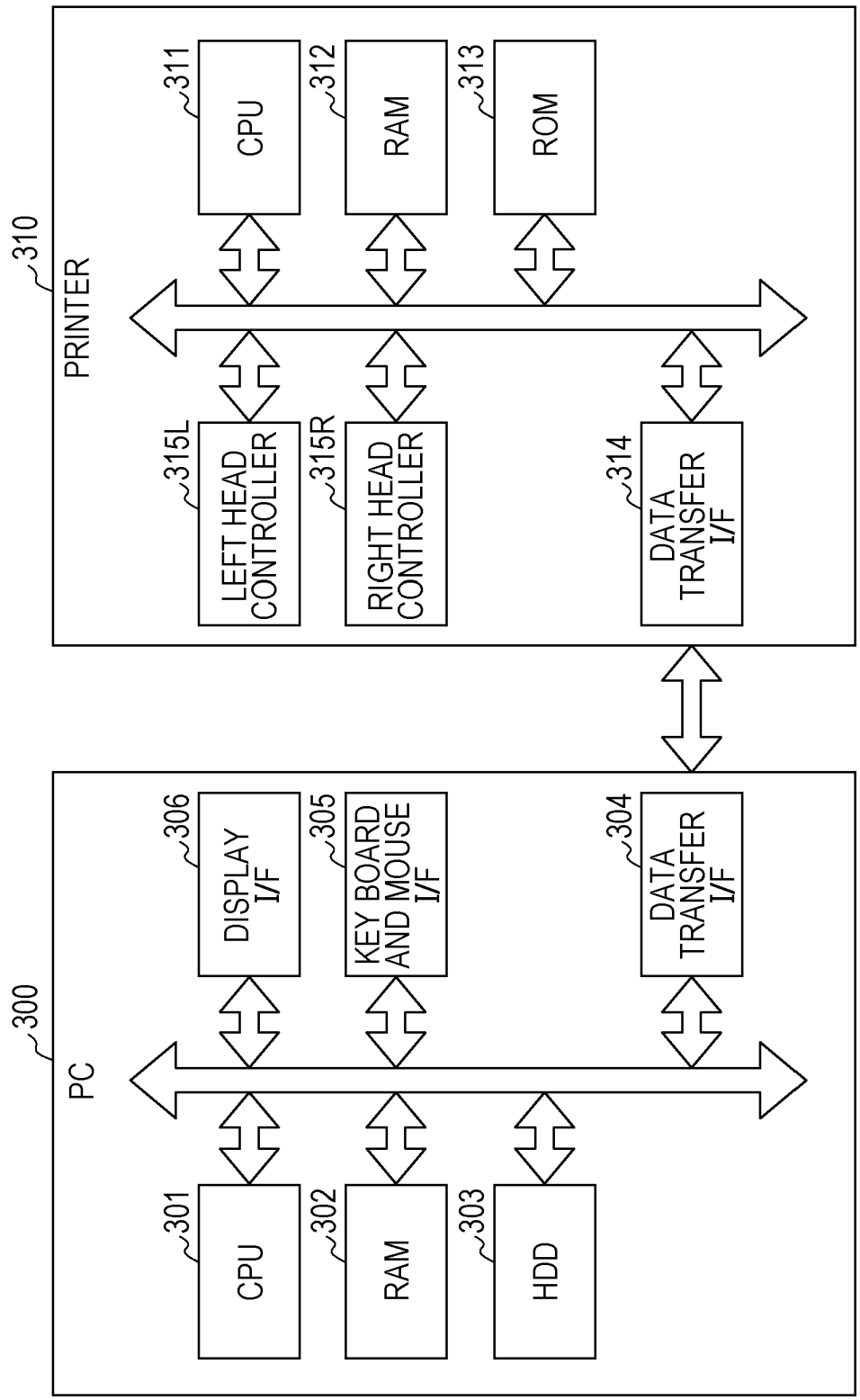
FIG. 5 is an explanatory diagram for describing a recording control system according to the exemplary embodiment.

FIG. 5 is a block diagram illustrating a schematic configuration of a recording control system according to the present exemplary embodiment. The recording control system according to the present exemplary embodiment is constituted by the printer 310 illustrated in FIG. 1 and a personal computer (hereinafter, which will be referred to as a PC) 300 functioning as a host apparatus thereof.

The PC 300 is constituted by including the following elements. A central processing unit (CPU) 301 functioning as an image processing unit executes processing in accordance with a program held in a random access memory (RAM) 302 or a hard disc drive (HDD) 303 functioning as a storage unit and generates RGB data represented by red (R), green (G), and blue (B) corresponding to a recording image. The RAM 302 is a volatile memory and temporarily holds a program or data. The HDD 303 is a non-volatile memory and holds a program or data. According to the present exemplary embodiment, a data transfer interface (I/F) 304 controls transmission and reception of RGB data between the CPU 301 and the printer 310. USB, IEEE1394, LAN, or the like can be used as a connection method for the data transmission and reception. A key board and mouse I/F 305 is an I/F that controls a human interface device (HID) such as a key board or a mouse, and a user can perform an input via this I/F. A display I/F 306 controls display on a display device (not illustrated).

On the other hand, the printer 310 is constituted by including the following elements. A CPU 311 functioning as an image processing unit executes respective processes which will be described below in accordance with programs held in a RAM 312 or a read only memory (ROM) 313. The RAM 312 is a volatile memory and temporarily holds a program or data. The ROM 313 is a non-volatile memory and can hold table data and programs used in the respective processes. It should be noted that a distribution pattern used in left and right head distribution processing which will be described below is also held in the ROM 313. A data transfer I/F 314 controls the data transmission and reception with the PC 300.

A left head controller 315L and a right head controller 315R respectively supply recording data to the recording head 102L and the recording head 102R illustrated in FIG. 3 and also control respective recording operations by the recording heads 102L and 102R (recording control). Specifically, a configuration can be adopted in which the left head controller 315L reads a control parameter and a recording data from a predetermined address of the RAM 312. When the CPU 311 writes the control parameter and the recording data in the predetermined address of the RAM 312, the processing by the left head controller 315L is activated, and the ink ejection from the recording head 102L is performed. The same applies to the right head controller 315R. When the CPU 311 writes the control parameter and the recording data in the predetermined address of the RAM 312, the processing by the right head controller 315R is executed, and the ink ejection from the recording head 102R is performed.

Figure 6:
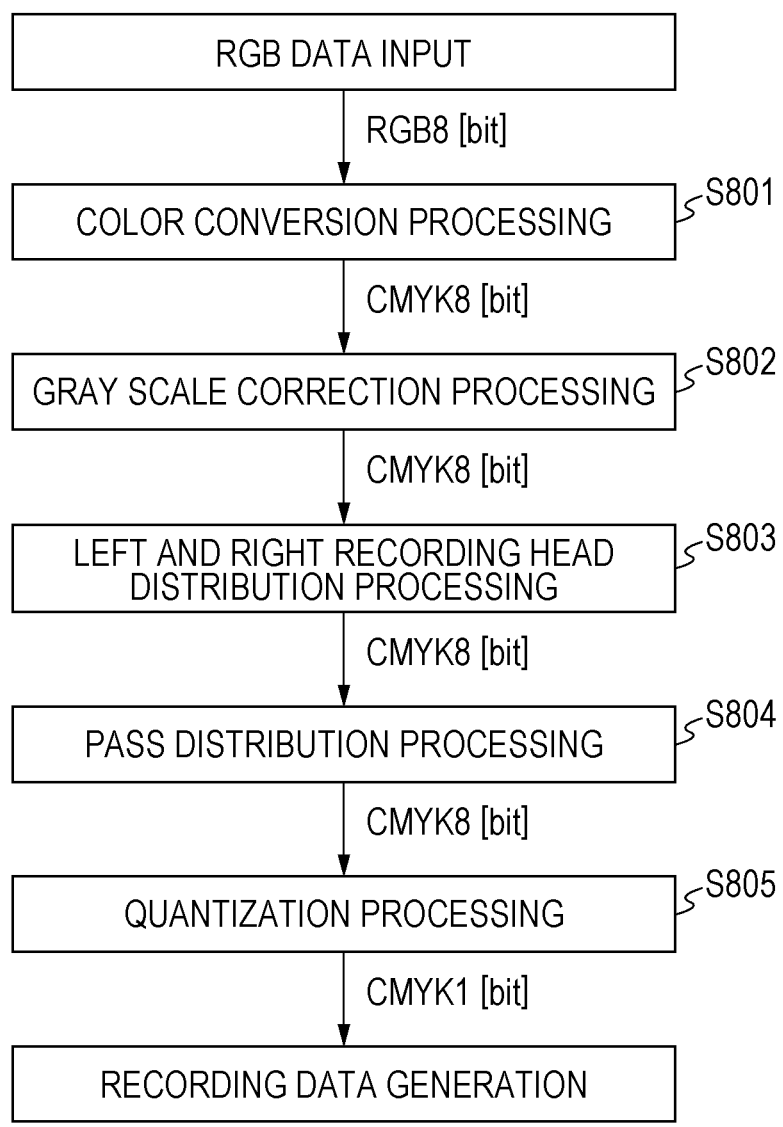
FIG. 6 is a flow chart illustrating a procedure of image processing according to the exemplary embodiment.

It should be noted that the mode in which only the single CPU 311 is arranged in the printer 310 has been described herein, but a plurality of CPUs may also be arranged.
Recording data generation FIG. 6 is a flow chart of recording data generation processing used for the recording which is executed by the CPU 311 in accordance with a control program according to the present exemplary embodiment. It should be noted that the control program is previously stored in the ROM 313.

When the RGB data in the RGB format is input to (obtained by) the recording apparatus 310 from the PC 300, first, in step S801, color conversion processing for converting the RGB data into ink color data corresponding to the colors of the ink used for the recording is performed. As a result of the color conversion processing, the ink color data represented by 8-bit 256-value information that sets a gray scale value in each of a plurality of pixels is generated. As described above, according to the present exemplary embodiment, since the black ink, the cyan ink, the magenta ink, and the yellow ink are used for the recording, as an example of the color conversion processing for generating the ink color data respectively corresponding to the black ink, the cyan ink, the magenta ink, and the yellow ink by the color conversion processing in step S801, a three-dimensional look-up table (3D-LUT) in which a correspondence relationship between RGB values previously stored in the ROM 313 and CMYK values is set can be used.

Next, in step S802, gray scale correction processing is executed for correcting a gray scale value indicated by ink color data of each of the CMYK values and generating gray scale correction data (image data) represented by 8-bit 256-value information for each of the CMYK values, In the gray scale correction processing, for example, a one-dimensional look-up table (1D-LUT) that sets a correspondence relationship between the ink color data corresponding to the ink of the respective colors before the correction and the gray scale correction data corresponding to the ink of the respective colors after the correction or the like can be used. It should be noted that this 1D-LUT is previously stored in the ROM 313.

Next, in step S803, distribution processing for distributing the gray scale correction data to the recording head 102L and the recording head 102R and generating head distribution data is executed.

From the perspective of each of the areas, since the recording is performed by only the recording head 102L in the area A1, the gray scale correction data corresponding to the area A1 is distributed to only the recording head 102L. In addition, since the recording is performed by only the recording head 102R in the area A3, the gray scale correction data corresponding to the area A3 is distributed to only the recording head 102R.

On the other hand, since the recording is performed by both the recording heads 102L and 102R in the area A2, the gray scale correction data corresponding to the area A2 is distributed to both the recording head 102L and the recording head 102R. Herein, according to the present exemplary embodiment, distribution of the gray scale correction data corresponding to the area A2 is performed such that a value indicated by the head distribution data corresponding to the recording head 102L and a value indicated by the head distribution data corresponding to the recording head 102R after the distribution become the same. For example, in a case where the value indicated by the gray scale correction data is "128" in a certain area, the left and right recording head distribution processing is performed such that the value indicated by the head distribution data corresponding to the recording head 102L becomes "64" and the value indicated by the head distribution data corresponding to the recording head 102R also becomes "64" in the area.

Next, in step S804, the head distribution data distributed to each of the recording heads 102L and 102R is further distributed to the first pass and the second pass in the two-pass recording to generate pass distribution data. At this time, according to the present exemplary embodiment, the head distribution data distributed to the recording head 102L is distributed to the first pass and the second pass such that a value indicated by the pass distribution data corresponding to the first pass and a value indicated by the pass distribution data corresponding to the second pass after the distribution become the same. For example, in a case where a value indicated by the head distribution data corresponding to the recording head 102L in a certain area is "64", pass distribution processing is performed such that a value indicated by the pass distribution data corresponding to the first pass of the recording head 102L becomes "32" and a value indicated by the head distribution data corresponding to the second pass of the recording head 102L also becomes "32" in the area.

Thereafter, in step S805, quantization processing is performed for quantizing each of the pass distribution data and generating recording data (binary data) used for the recording which is represented by 1-bit 2-value information for setting ejection or non-ejection of the ink of the respective colors with respect to the respective pixels. The quantization processing will be described below.

It should be noted herein that the mode has been described in which all the processes in steps S801 to S805 are executed by the CPU 311 in the printer 310, but the CPU 301 in the PC 300 may also execute part or all of the processes in steps S801 to S805.

Quantization Processing according to the Present Exemplary Embodiment

Hereinafter, the quantization processing executed according to the present exemplary embodiment will be described in detail.

According to the present exemplary embodiment, the quantization is performed by using a dither pattern in which thresholds for setting the ejection or non-ejection of the ink with respect to the respective pixels are arranged.

Different thresholds are set with respect to the respective pixels in the dither pattern. A range of values that the thresholds may take corresponds to a range of values that may be indicated by the input multi-valued data. For example, when the multi-valued data is 8-bit 256-value data, one of thresholds 1 to 256 is set in each of the pixels.

Herein, in a case where the value indicated by the multi-valued data is higher than or equal to a threshold in a certain pixel, the multi-valued data is converted into the recording data indicating the ejection of the ink with respect to the pixel. On the other hand, in a case where a value indicated by the multi-valued data in a certain pixel is lower than a threshold, the multi-valued data is converted into the recording data indicating the non-ejection of the ink with respect to the pixel.

FIGS. 7A to 7D illustrate a dither pattern 70 among a plurality of dither patterns used according to the present exemplary embodiment. As illustrated in FIG. 7A, the dither pattern 70 according to the present exemplary embodiment has a size of 512 pixels×512 pixels. It should be noted that, for simplicity, although omitted in FIG. 7A, the thresholds 1 to 256 are set with respect to the respective pixels having a size of 512 pixels×512 pixels in actuality.

FIG. 7B illustrates an extraction of a partial area 80a having a size of 4 pixels×4 pixels from among the dither pattern having a size of 512 pixels×512 pixels illustrated in FIG. 7A. In actuality, the thresholds are set with respect to the respective pixels in the entire dither pattern 70 having a size of 512 pixels×512 pixels illustrated in FIG. 7A in accordance with rules which will be described below, but herein, for simplicity, descriptions will be provided of the area 80a having a size of 4 pixels×4 pixels illustrated in FIG. 7B.

A dot arrangement determined as a result of the quantization by using the area 70a in the dither pattern illustrated in FIG. 7B will be described.

FIG. 7C illustrates a dot arrangement formed by the recording data obtained when the quantization by using the area 70a in the dither pattern 70 is performed with respect to the multi-valued data indicating a value of "64". At this time, in the dither pattern 70, the ejection of the ink is set with respect to the pixels having a threshold lower than or equal to "64" corresponding to the value of the multi-valued data, and the non-ejection of the ink is set with respect to the pixels having a threshold higher than "64". As a result, the ink is ejected to the pixels marked out in black illustrated in FIG. 7C.

FIG. 7D illustrates a dot arrangement formed by the recording data obtained when the quantization by using the area 70a in the dither pattern 70 is performed with respect to the multi-valued data indicating a value of "128". At this time, in the dither pattern 70, the ejection of the ink is set with respect to the pixels having a threshold lower than or equal to "128" corresponding to the value of the multi-valued data, and the non-ejection of the ink is set with respect to the pixels having a threshold higher than "128". As a result, the ink is ejected to the pixels marked out in black illustrated in FIG. 7D.

According to the present exemplary embodiment, the quantization processing in steps S806 to S809 is executed by using a plurality of dither patterns including the dither pattern 70 described above.

FIGS. 8A, 8B1 and 8B2, 8C1 to 8C4, and 8D1 to 8D8 are explanatory diagrams for describing procedures of the head distribution processing, the pass distribution processing, and the quantization processing corresponding to each of the areas A1, A2, and A3 according to the present exemplary embodiment.

Herein, as illustrated in FIG. 8A, a case as an example where image data indicating a value of "256" is respectively processed as image data ImA1 in the area A1, image data ImA2 in the area A2, and image data ImA3 in the area A3 after the gray scale correction processing (S802) will be described. That is, a case is illustrated where the image data for recording the so-called solid image is processed.

FIG. 8B1 illustrates head distribution data GrA1_L, GrA2_L, and GrA3_L corresponding to the recording head 102L generated after the left and right head distribution processing (S803) is performed with respect to the image data ImA1, ImA2, and ImA3 illustrated in FIG. 8A. FIG. 8B2 illustrates head distribution data GrA1_R, GrA2_R, and GrA3_R corresponding to the recording head 102R.

As described above, since the image data corresponding to the area A1 is not distributed to the recording head 102R and is distributed to only the recording head 102L, in a case where the image data illustrated in FIG. 8A is processed, the head distribution data GrA1_L corresponding to the recording head 102L and the area A1 takes a value of "256", and the head distribution data GrA1_R corresponding to the recording head 102R and the area A1 takes a value of "0". Similarly, since the image data corresponding to the area A3 is distributed to only the recording head 102R, the head distribution data GrA3_L corresponding to the recording head 102L and the area A3 takes a value of "0", and the head distribution data GrA3_R corresponding to the recording head 102R and the area A3 takes a value of "256".

It should be noted that, even when the image data is any data, since the value of the head distribution data GrA1_R corresponding to the recording head 102R and the area A1 and the value of the head distribution data GrA3_L corresponding to the recording head 102L and the area A3 become "0", descriptions of the head distribution data GrA1_R and MuA3_L will be omitted in the following explanation.

On the other hand, since the same value is distributed to each of the recording heads 102L and 102R with regard to the image data corresponding to the area A2, both the head distribution data GrA2_L corresponding to the recording head 102L and the area A2 and the head distribution data GrA2_R corresponding to the recording head 102R and the area A2 take a value of "128".

Next, the pass distribution processing in step S804 is performed with respect to the head distribution data GrA1_L, GrA2_L, and GrA3_L. FIG. 8C1 illustrates multi-valued data MuA1_L1, MuA2_L1, and MuA3_L1 corresponding to the recording head 102L and the first pass which are generated as a result of the pass distribution processing. FIG. 8C2 illustrates similarly generated multi-valued data MuA1_L2, MuA2_L2, and MuA3_L2 corresponding to the recording head 102L and the second pass.

As described above, the same value of the head distribution data is distributed to each of the first pass and the second pass. Therefore, since the value indicated by the head distribution data GrA1_L corresponding to the area A1 is "256", the value indicated by the multi-valued data MuA1_L1 generated by the distribution to the first pass becomes "128", and the value indicated by the multi-valued data MuA1_L1 generated by the distribution to the second pass also becomes "128". Similarly, with regard to the area A2 too, both the multi-valued data MuA2_L1 corresponding to the first pass and the multi-valued data MuA2_L2 corresponding to the second pass take a value of "64".

Next, the pass distribution processing in step S805 is performed with respect to the head distribution data GrA1_R, GrA2_R, and GrA3_R. FIG. 8C3 illustrates multi-valued data MuA1_R1, MuA2_R1, and MuA3_R1 corresponding to the recording head 102R and the first pass which are generated as a result of the pass distribution processing. FIG. 8C4 illustrates similarly generated multi-valued data MuA1_R2, MuA2_R2, MuA3_R2 corresponding to the recording head 102R and the second pass.

Since the same value of the head distribution data is similarly distributed to each of the first pass and the second pass, with regard to the area A2, both the multi-valued data MuA2_R1 corresponding to the first pass and the multi-valued data MuA2_R2 corresponding to the second pass take a value of "64". With regard to the area A3, both the multi-valued data MuA3_R1 corresponding to the first pass and the multi-valued data MuA3_R2 corresponding to the second pass take a value of "128".

In this manner, the multi-valued data illustrated in FIGS. 8C1 to 8C4 is obtained by the head distribution processing and the pass distribution processing. Specifically, the eight pieces of multi-valued data are obtained including (1) the multi-valued data MuA1_L1 corresponding to the area A1, the recording head 102L, and the first pass, (2) the multi-valued data MuA2_L1 corresponding to the area A2, the recording head 102L, and the first pass, (3) the multi-valued data MuA1_L2 corresponding to the area A1, the recording head 102L, and the second pass, (4) the multi-valued data MuA2_L2 corresponding to the area A2, the recording head 102L, and the second pass, (5) the multi-valued data MuA2_R1 corresponding to the area A2, the recording head 102R, and the first pass, (6) the multi-valued data MuA3_R1 corresponding to the area A3, the recording head 102R, and the first pass, (7) the multi-valued data MuA2_R2 corresponding to the area A2, the recording head 102R, and the second pass, and (8) the multi-valued data MuA3_R2 corresponding to the area A3, the recording head 102R, and the second pass. The quantization processing is executed with respect to the eight pieces of multi-valued data in the following manner.

Figure 9:
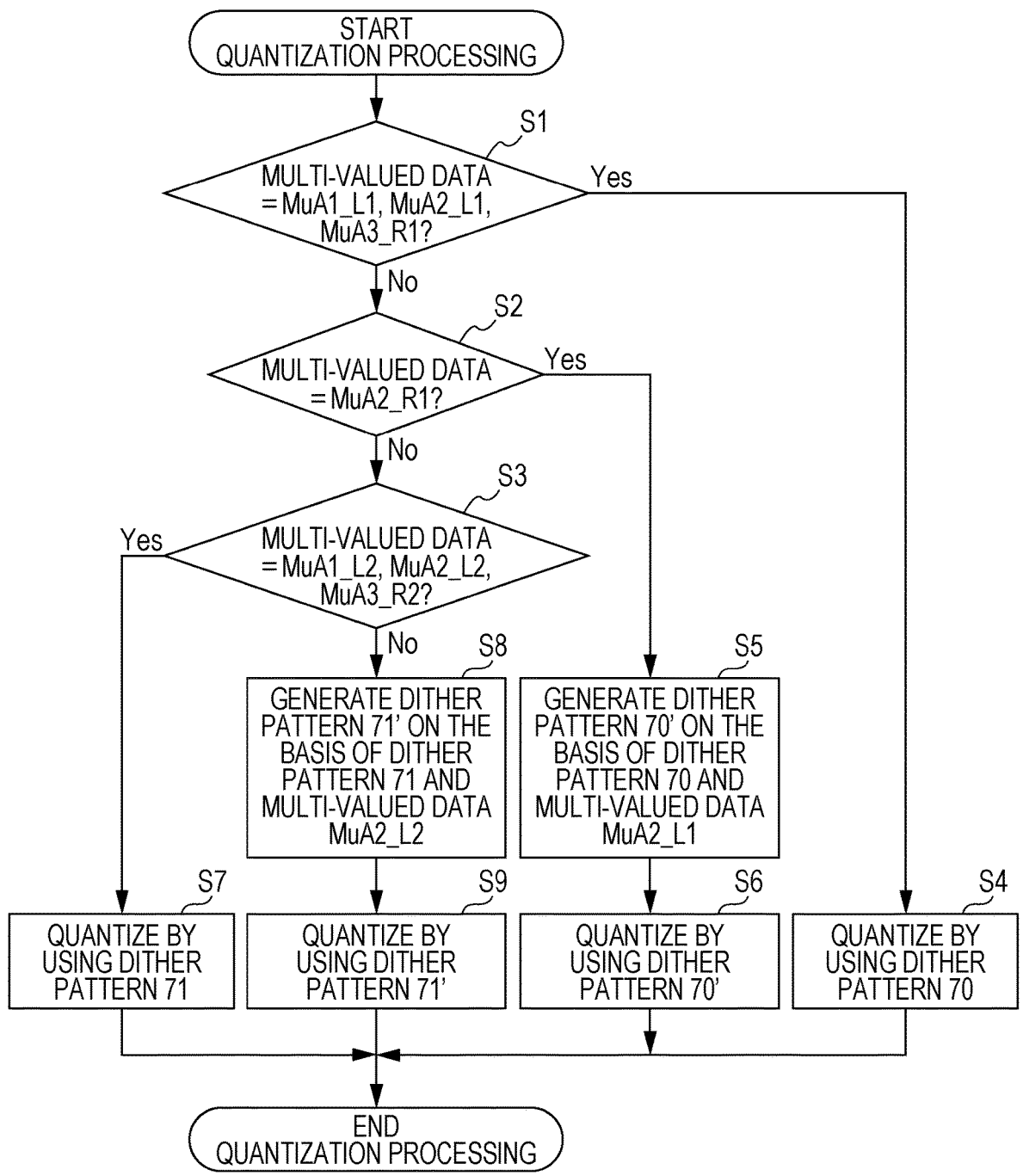
FIG. 9 is a flow chart illustrating a procedure of the image processing according to the exemplary embodiment.

FIG. 9 is a flow chart of the quantization processing executed by the CPU 311 in accordance with the control program according to the present exemplary embodiment.

First, in step S1, it is determined whether or not the multi-valued data is one of the multi-valued data MuA1_L1, MuA2_L1, and MuA3_R1. When the multi-valued data is one of the three pieces of multi-valued data, the flow proceeds to step S4 which will be described below. When the multi-valued data is one of the other five pieces of multi-valued data, the flow proceeds to step S2.

In step S2, it is determined whether or not the multi-valued data is the multi-valued data MuA2_R1. When the multi-valued data is the multi-valued data MuA2_R1, the flow proceeds to step S5 which will be described below. When the multi-valued data is one of the other four pieces of multi-valued data, the flow proceeds to step S3.

Next, in step S3, it is determined whether or not the multi-valued data is one of the multi-valued data MuA1_L2, MuA2_L2, and MuA3_R2. When the multi-valued data is one of the three pieces of multi-valued data, the flow proceeds to step S7 which will be described below. When the multi-valued data is the other multi-valued data, that is, the multi-valued data MuA2_R2 corresponding to the remaining multi-valued data, the flow proceeds to step S8 which will be described below.

The processing in steps S4 to S9 will be described below in detail.

When the dot arrangement differs between the non-overlap recording areas A1 and A3 and the overlap recording area A2 in the same scanning, the granular impression and the uniformity differ between those areas. Therefore, according to the present exemplary embodiment, the quantization processing is performed such that the dot arrangement becomes the same between the non-overlap recording areas A1 and A3 and the overlap recording area in the same scanning.

On the other hand, when a deviation is caused in landing positions of the ink ejection in the multiple scanning operations with respect to the same area due to any cause, there is a fear that the image density is largely decreased as compared with a case where the landing position deviation is not caused. The decrease in the image quality becomes particularly conspicuous when the dots are formed at exclusive and also complementary positions by the multiple scanning operations. Therefore, according to the present exemplary embodiment, even in a case where the deviation in the ejection positions of the ink is not caused in the first pass and the second pass with regard to the same area, the quantization processing is performed such that dots are overlapped to be recorded at the same positions to a certain extent.

First, in step S4, the quantization is performed with respect to (1) the multi-valued data MuA1_L1 corresponding to the area A1, the recording head 102L, and the first pass, (2) the multi-valued data MuA2_L1 corresponding to the area A2, the recording head 102L, and the first pass, and (6) the multi-valued data MuA3_R1 corresponding to the area A3, the recording head 102R, and the first pass. In step S4, the quantization is executed with respect to each of the multi-valued data by using the dither pattern 70 illustrated in FIGS. 7A to 7D described above.

As illustrated in FIGS. 8C1 and 8C3, the values indicated by the respective pixels of (1) the multi-valued data MuA1_L1 and (6) the multi-valued data MuA3_R1 are "128". Therefore, the ejection of the ink is set with respect to the pixels corresponding to the pixels where the thresholds lower than or equal to "128" are set in the dither pattern 70. An area corresponding to the area 70a when the quantization is performed by using the dither pattern 70 with respect to the multi-valued data the multi-valued data MuA1_L1 is recording data BiA1_L1 illustrated in FIG. 8D1. In the recording data BiA1_L1, the ejection of the ink is set with respect to the pixels corresponding to the pixels where the thresholds "16" to "128" are set in the area 70a. Similarly, an area corresponding to the area 70a when the quantization is performed by using the dither pattern 70 with respect to the multi-valued data MuA3_R1 is recording data BiA3_R1 illustrated in FIG. 8D6. Herein, the recording data BiA1_L1 is the recording data used in the area A1, the recording head 102L, and the first pass, and the recording data BiA3_R1 is the recording data used in the area A3, the recording head 102R, and the first pass.

On the other hand, as illustrated in FIG. 8C1, the values indicated by the respective pixels of (2) the multi-valued data MuA2_L1 are "64". Therefore, the ejection of the ink is set with respect to the pixels corresponding to the pixels where the thresholds lower than or equal to "64" are set in the dither pattern 70. An area corresponding to the area 70a when the quantization is performed by using the dither pattern 70 with respect to the multi-valued data MuA2_L1 is recording data BiA2_L1 illustrated in FIG. 8D2. In the recording data BiA2_L1, the ejection of the ink is set with respect to the pixels corresponding to the pixels where the thresholds "16" to "64" are set in the area 70a. Herein, the recording data BiA2_L1 is the recording data used in the area A2, the recording head 102L, and the first pass.

Next, in step S5, (5) to perform the quantization with respect to the multi-valued data MuA2_R1 corresponding to the area A2, the recording head 102R, and the first pass, a dither pattern 70' is generated first on the basis of the dither pattern 70 and the multi-valued data MuA2_L1. In more detail, the dither pattern 70' is generated by subtracting values indicated by the multi-valued data MuA2_L1 from the thresholds set in the respective pixels in the dither pattern 70. Herein, since the value indicated by the multi-valued data MuA2_L1 is "64", the dither pattern 70' is generated by subtracting "64" from the respective thresholds in the dither pattern 70.

FIG. 10A illustrates the thus generated dither pattern 70'. As described above, since the dither pattern 70' is generated by subtracting the values in the multi-valued data MuA2_L1 from the thresholds in the dither pattern 70 of FIGS. 7A to 7D, a size of the dither pattern 70' after the subtraction is 512 pixels×512 pixels which is the same as that of the dither pattern 70 before the subtraction.

FIG. 10B illustrates an area 70a' having a size of 4 pixels×4 pixels corresponding to a part of the dither pattern 70'. It should be noted that the area 70a' illustrated in FIG. 10B corresponds to the same area as an area 70a illustrated in FIG. 7B.

The generation of the dither pattern 70' based on the subtraction will be described in more detail. For example, the threshold "144" is set for the pixel at the top in the rightmost column in the area 70a of the dither pattern before the subtraction which is illustrated in FIG. 7B. Therefore, the threshold "80" is set for the pixel at the top in the rightmost column in the area 70a' of the dither pattern after the subtraction which is illustrated in FIG. 10B (80=144−64).

The threshold "240" is set for the pixel at the bottom in the rightmost column in the area 70a of the dither pattern before the subtraction which is illustrated in FIG. 7B. Therefore, the threshold "176" is set for the pixel at the bottom in the rightmost column in the area 70a' of the dither pattern after the subtraction which is illustrated in FIG. 10B (176=240−64).

In a case where the value obtained as a result of the subtraction with respect to a certain pixel becomes a value lower than or equal to 0, an absolute value of the subtraction result is further subtracted from "256" corresponding to the highest value of the threshold to be set as a threshold in the dither pattern 70'. For example, the threshold "48" is set for the pixel at the top in the leftmost column in the area 70a of the dither pattern before the subtraction which is illustrated in FIG. 7B. For this reason, the subtraction result becomes "−16". Therefore, the threshold "240" is set for the pixel at the top in the leftmost column in the area 70a' of the dither pattern after the subtraction which is illustrated in FIG. 10B (240=256−16).

The dither pattern 70' is generated in the above-described manner.

Next, in step S6, the quantization is executed with respect to (5) the multi-valued data MuA2_R1 corresponding to the area A2, the recording head 102R, and the first pass by using the dither pattern 70'.

As illustrated in FIG. 8C3, the values indicated by the respective pixels of (5) the multi-valued data MuA2_R1 corresponding to the area A2, the recording head 102R, and the first pass are "64". Therefore, the ejection of the ink is set with respect to the pixels corresponding to the pixels where the thresholds lower than or equal to "64" are set in the dither pattern 70'. The area corresponding to the area 70a' when the quantization is performed by using the dither pattern 70' with respect to the multi-valued data the multi-valued data MuA2_R1 is recording data BiA2_R1 illustrated in FIG. 8D5. In the recording data BiA2_R1, the ejection of the ink is set with respect to the pixels corresponding to the pixels where the thresholds "16" to "64" are set in the area 70a'. Herein, the recording data BiA2_R1 is recording data used in the area A2, the recording head 102R, and the first pass.

Herein, the recording data BiA2_L1 illustrated in FIG. 8D2 and the recording data BiA2_R1 illustrated in FIG. 8D5 are data used in the recording scanning in the first pass with respect to the overlap recording area A2. That is, the recording of the image with respect to the overlap recording area A is performed by using the two recording heads in the single scanning operation. Therefore, the dot arrangement in the recording of the first pass with respect to the overlap recording area A2 is a logical sum of the recording data BiA2_L1 and the recording data BiA2_R1. The dot arrangement of the logical sum is the same as the recording data BiA1_L1 illustrated in FIG. 8D1 and the recording data BiA3_R1 illustrated in FIG. 8D6. That is, the dot arrangement recorded in the non-overlap recording area A1, the dot arrangement recorded in the non-overlap recording area A3, and the dot arrangement recorded in the overlap recording area A2 become the same in the first pass.

Next, in step S7, the quantization processing is performed with respect to (3) the multi-valued data MuA1_L2 corresponding to the area A1, the recording head 102L, and the second pass, (4) the multi-valued data MuA2_L2 corresponding to the area A2, the recording head 102L, and the second pass, and (8) the multi-valued data MuA3_R2 corresponding to the area A3, the recording head 102R, and the second pass. In step S7, the quantization is executed by using a previously stored dither pattern 71.

Figures 11A, 11B:
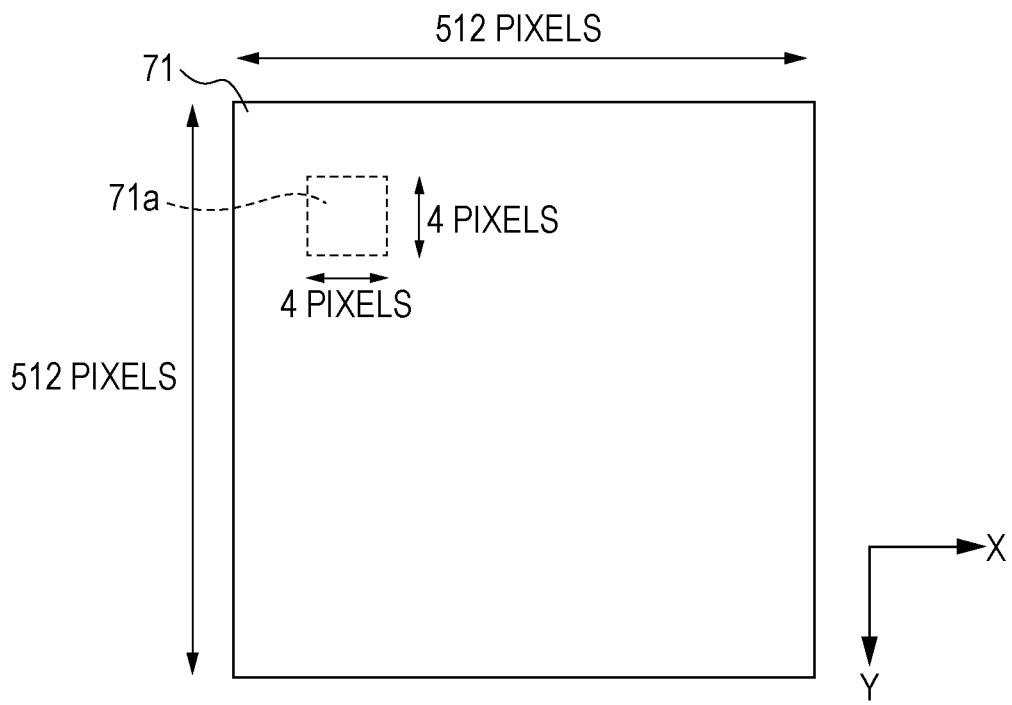
FIGS. 11A and 11B are explanatory diagrams for describing the dither pattern according to the exemplary embodiment.

FIG. 11A illustrates the dither pattern 71 used in step S7. A size of the dither pattern 71 is 512 pixels×512 pixels which is the same as that of the dither pattern 70. FIG. 11B illustrates an area 71a having a size of 4 pixels×4 pixels which is a part of the dither pattern 71. It should be noted that the area 71a illustrated in FIG. 11B corresponds to the area 70a illustrated in FIG. 7B.

Herein, the dither pattern 71 and the dither pattern 70 have mutually different threshold arrangements.

Figure 8:
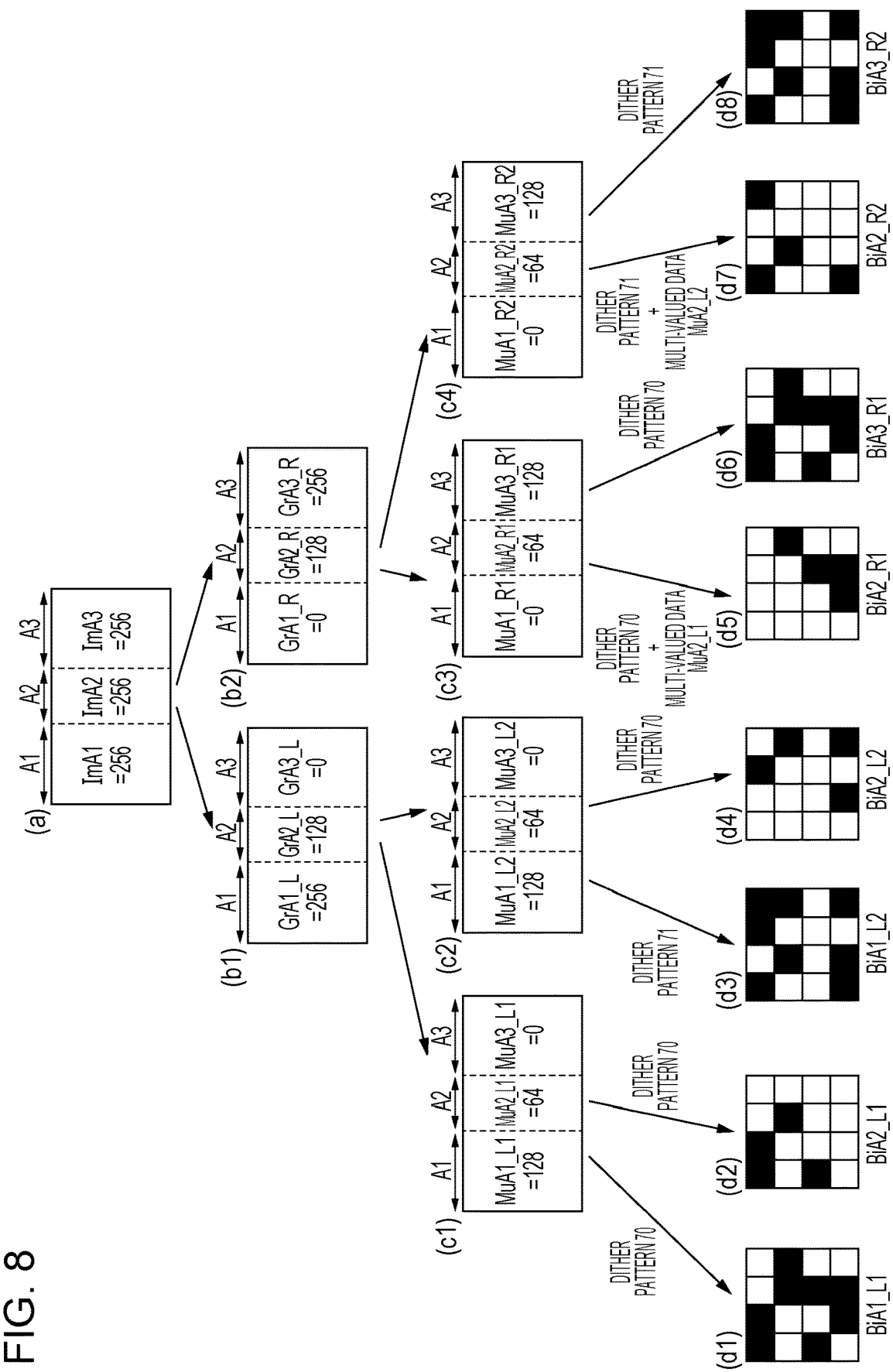

As illustrated in FIG. 8C2 and FIG. 8C4, the values indicated by the respective pixels of (3) the multi-valued data MuA1_L2 and (8) the multi-valued data MuA3_R2 are "128". Therefore, the ejection of the ink is set with respect to the pixels corresponding to the pixels where the thresholds lower than or equal to "128" are set in the dither pattern 71. The area corresponding to the area 71a when the quantization is performed by using the dither pattern 71 with respect to the multi-valued data MuA1_L2 is recording data BiA1_L2 illustrated in FIG. 8D3. In the recording data BiA1_L2, the ejection of the ink is set with respect to the pixels corresponding to the pixels where the thresholds "16" to "128" are set in the area 71a. Similarly, the area corresponding to the area 71a when the quantization is performed by using the dither pattern 71 with respect to the multi-valued data MuA3_R2 is recording data BiA3_R2 illustrated in FIG. 8D8. Herein, the recording data BiA1_L2 is recording data used in the area A1, the recording head 102L, and the second pass, and the recording data BiA3_R2 is recording data used in the area A3, the recording head 102R, and the second pass.

On the other hand, as illustrated in FIG. 8C2, the values indicated by the respective pixels of (2) the multi-valued data MuA2_L2 are "64". Therefore, the ejection of the ink is set with respect to the pixels corresponding to the pixels where the thresholds lower than or equal to "64" are set in the dither pattern 71. The area corresponding to the area 71a when the quantization is performed by using the dither pattern 71 with respect to the multi-valued data MuA2_L2 is the recording data BiA2_L2 illustrated in FIG. 8D4. In the recording data BiA2_L2, the ejection of the ink is set with respect to the pixels corresponding to the pixels where the thresholds "16" to "64" are set in the area 71a. Herein, the recording data BiA2_L2 is recording data used in the area A2, the recording head 102L, and the second pass.

Herein, the recording data BiA1_L1 illustrated in FIG. 8D1 and the recording data BiA1_L2 illustrated in FIG. 8D3 are data used when the image is recorded with respect to the non-overlap recording area A1 by the recording head 102L. That is, the recording of the image with respect to the area A1 is performed by the multiple scanning operations by using the single recording head. The ejection of the ink with respect to 8 pixels among 4 pixels×4 pixels in each of the recording data BiA1_L1 illustrated in FIG. 8D1 and the recording data BiA1_L2 illustrated in FIG. 8D3, but among those, the ejection of the ink is set for the pixel at the top in the leftmost column, the pixel at the bottom in the second column from the left, and the pixel at the second position from the top in the rightmost column in both the recording data BiA1_L1 and the recording data BiA1_L2. That is, in the recording with respect to the area A1, the ink is ejected from the recording head 102L to the 3 pixels among 4 pixels×4 pixels by the scanning operations in both the first pass and the second pass. This is because a design has been made such that a part of pixels in which a threshold lower than or equal to "128" is set in the dither pattern 70 and a part of pixels in which the thresholds lower than or equal to "128" are set in the dither pattern 71 become the corresponding same pixel positions. This design is to cope with the decrease in the image quality which may occur in a case where the landing position deviation on the recording medium is caused in the recording operations based on the multiple scanning operations, and dots of the ink to be applied to adjacent pixels on the recording data are overlapped with each other on the recording medium. In a case where the image is recorded by the multiple scanning operations, when it is previously designed that the ink is ejected by at least two scanning operations among the multiple scanning operations with regard to a part of the pixels, even in a case where the overlap of the dots based on the landing position deviation is caused, it is possible to suppress the difference in the image quality as compared with a case where the landing position deviation is not caused. It should be noted that the number of pixels on the recording medium to which the dots are applied while being overlapped with each other in a case where the landing position deviation is caused and the number of pixels on the recording medium to which the dots are applied while being overlapped with each other in a case where the landing position deviation is not caused are preferably set to be substantially equal to each other. At this time, the pixels to which the dots are applied while being overlapped with each other are obtained by calculating a product of the recording data corresponding to the multiple scanning operations.

Next, in step S8, to perform the quantization processing with respect to (7) the multi-valued data MuA2_R2 corresponding to the area A2, the recording head 102R, and the second pass, first, a dither pattern 71' is generated on the basis of the dither pattern 71 and the multi-valued data MuA2_L2. In more detail, the dither pattern 71' is generated by subtracting the values indicated by the multi-valued data MuA2_L2 from the thresholds set for the respective pixels in the dither pattern 71. In this example, "64" is subtracted from the respective thresholds in the dither pattern 71 since the values indicated by the respective pixels of the multi-valued data MuA2_L2 are "64".

FIG. 12A illustrates the thus generated dither pattern 71'. As described above, the dither pattern 71' is generated by subtracting the values in the multi-valued data MuA2_L2 from the thresholds in the dither pattern 70 of FIGS. 11A and 11B. Therefore, a size of the dither pattern 71' after the subtraction is 512 pixels×512 pixels which is the same as that of the dither pattern 71 before the subtraction.

FIG. 12B illustrates an area 71a' having a size of 4 pixels×4 pixels corresponding to a part of the dither pattern 71'. It should be noted that the area 71a' illustrated in FIG. 12B corresponds to the same area as the area 71a illustrated in FIG. 11B.

It should be noted that the actual subtraction processing is similar to the processing performed when the dither pattern 70' is generated by using the dither pattern 70 and the multi-valued data MuA2_L1, descriptions thereof will be omitted.

Next, in step S9, the quantization is executed by using the dither pattern 71' with respect to (7) the multi-valued data MuA2_R2 corresponding to the area A2, the recording head 102R, and the second pass.

As illustrated in FIG. 8C4, the values indicated by the respective pixels of (7) the multi-valued data MuA2_R2 are "64". Therefore, the ejection of the ink is set with respect to the pixels corresponding to the pixels where the thresholds lower than or equal to "64" are set in the dither pattern 71'. An area corresponding to the area 71a20 when the quantization is performed by using the dither pattern 71' with respect to the multi-valued data MuA2_R2 is recording data BiA2_R2 illustrated in FIG. 8D7. In the recording data BiA2_R2, the ejection of the ink is set with respect to the pixels corresponding to the pixels where the thresholds "16" to "64" are set in the area 71a'. Herein, the recording data BiA2_R2 is recording data used in the area A2, the recording head 102R, and the second pass.

Herein, a logical sum of the recording data BiA2_L2 and the recording data BiA2_R2 illustrated in FIG. 8D4 and the recording data BiA1_L2 illustrated in FIG. 8D3, and the recording data BiA3_R2 illustrated in FIG. 8D8 are compared with one another. Herein, in the second pass too, the dot arrangements in the non-overlap areas A1 and A3 become the same as the dot arrangement in the overlap recording area A2.

As described above, according to the present exemplary embodiment, while the dot arrangement in the overlap recording area and the dot arrangements in the non-overlap recording areas are set to be the same, the dot formation positions are partially overlapped with each other among different scanning operations, and the ink is ejected to the same position multiple times to be overlapped with each other and arranged. With this configuration, even in a case where the ink ejection position deviation is caused, it is possible to suppress the change in the recording image.

Second Exemplary Embodiment

According to the present exemplary embodiment, a dither pattern 80 which will be described below is used instead of the dither pattern 70 used according to the first exemplary embodiment, and a dither pattern 81 which will be described below is used instead of the dither pattern 71 to perform the quantization processing. The dither patterns 80 and 81 indicate a spatial frequency characteristic in which the number of low frequency components is low.

It should be noted that descriptions of parts similar to the above-described first exemplary embodiment will be omitted.

FIGS. 13A to 13D illustrate the dither pattern 80 used according to the present exemplary embodiment. As illustrated in FIG. 13A, the dither pattern 80 according to the present exemplary embodiment has a size of 512 pixels×512 pixels. It should be noted that, for simplicity, although omitted in FIG. 13A, one of thresholds 1 to 256 is set in each of the pixels having a size of 512 pixels×512 pixels in actuality.

Herein, in the subsequent descriptions, when the thresholds 1 to 256 are classified into four groups including 1 to 64, 65 to 128, 129 to 192, and 193 to 256, the thresholds 1 to 64 equivalent to the group of the lowest thresholds will be referred to as "lowest thresholds". The thresholds 65 to 128 equivalent to the group of the second lowest thresholds after the "lowest thresholds" among the above-described four groups will be referred to as "second lowest thresholds".

FIG. 13B illustrates an extraction of a partial area 80a having a size of 4 pixels×4 pixels from among the dither pattern having a size of 512 pixels×512 pixels illustrated in FIG. 13A.

The dither pattern 80 illustrated in FIG. 13A used according to the present exemplary embodiment is different from the dither pattern 70 illustrated in FIG. 7A. Specifically, the thresholds are set with respect to the respective pixels such that a dispersibility of the pixels in which the lowest thresholds are set becomes higher than a dispersibility of the pixels in which the second lowest thresholds are set. The ejection of the ink is set with respect to the pixels in which the lowest thresholds are set even in a case where the input multi-valued values are relatively low such as, for example, 65, 66, and 67. That is, the pixels in which the lowest thresholds are set in the dither pattern 80 are pixels where the ejection of the ink is likely to be set. For this reason, according to the present exemplary embodiment, the pixels in which the lowest thresholds are set are processed by priority such that the dispersibility of the pixels in which the lowest thresholds becomes higher than a dispersibility of the pixels in which other thresholds are set.

To evaluate a dispersibility of pixels in a certain area, a method of using a spatial frequency characteristic in accordance with an arrangement of the pixels in the certain area has been proposed. The spatial frequency characteristic is generally used as an index for evaluating the dispersibility of the pixels. The spatial frequency characteristic in accordance with the arrangement of the pixels can be obtained by converting the pixel arrangement from a spatial area into a frequency area while following a method described in "T. Mitsa and K. J. Parker, digital Halftoning using a Blue Noise Mask Proc. SPIE 1452, pp. 47-56 (1991)" or the like. The spatial frequency obtained by the above-described method is two-dimensionally represented while the horizontal axis represents a frequency and the vertical axis represents an output value in accordance with each frequency (power spectrum).

In general, the spatial frequency characteristic has the large power spectrum at the relatively low frequency (low frequency area) in a case where the dispersibility of the pixels is low, and the spatial frequency characteristic has the large power spectrum at the relatively high frequency (high frequency area) in a case where the dispersibility is high. Herein, according to the present exemplary embodiment, with regard to the low frequency component, in a range of the frequency area where the power spectrum exists, a half of the range closer to the low frequency will be referred to as a low frequency area, and the other half of the range closer to the high frequency will be referred to as a high frequency area. The power spectrum existing in the above-described low frequency area will be referred to as a low frequency component. As specific numeral values, in the dither pattern having a size of 512 pixels×512 pixels, the power spectrum existing in a range lower than 15 [cycle/mm] is preferably set as the low frequency component. In addition, the comparison of the low frequency components is preferably performed by an integral value of the power spectrum belonging to the low frequency area.

To set the dither pattern 80 according to the present exemplary embodiment described above, the thresholds may be set with respect to the respective pixels such that the number of the low frequency components in the spatial frequency characteristic in accordance with the arrangement of the pixels in which the lowest thresholds are set (threshold pixel arrangement) becomes lower than the number of the low frequency components in the spatial frequency characteristic in accordance with the arrangement of the pixels in which the second lowest thresholds are set (threshold pixel arrangement).

The "dispersibility" corresponds to "uniformity of dense and sparse states". Herein, in a case where two pixels are arranged at adjacent positions to each other, the two pixels are "dense". In contrast, in a case where the two pixels are arranged at positions away from each other, the two pixels are "sparse". For example, in a case where predetermined pixels are two-dimensionally arranged at a certain interval in a certain space, that is, a case where the dense and sparse states of the predetermined pixels are substantially uniform in the space, this state corresponds to the "high dispersibility" of the predetermined pixels. On the other hand, in a case where the number of the predetermined pixels in a certain area in a certain space is high and also the pixels are arranged to be adjacent to one another, and the number of the predetermined pixels in another area is low and also the pixels are arranged away from one another, that is, a case where the dense and sparse states of the predetermined pixels vary in accordance with the areas in the space (dense and sparse states fluctuate), this state corresponds to the "low dispersibility" of the predetermined pixels.

FIG. 13C illustrates a state in which four pixels where the lowest thresholds (herein, 16, 32, 48, and 64) are set in the area 80a in the dither pattern illustrated in FIG. 13B are marked out in black. FIG. 13D illustrates a state in which four pixels where the second lowest thresholds (herein, 80, 96, 112, and 128) are set in the area 80a in the dither pattern illustrated in FIG. 13B are marked out in black.

As may be understood from the comparison between FIG. 13C and FIG. 13D, the pixels in which the lowest thresholds are set which are illustrated in FIG. 13C have the higher dispersibility than the pixels in which the second lowest thresholds are set which are illustrated in FIG. 13D.

Descriptions will be provided of the dense and sparse states. The four pixels illustrated in FIG. 13C in which the lowest thresholds are set are arranged at positions away from one another by substantially the same distance. In contrast to this, the four pixels illustrated in FIG. 13D in which the second lowest thresholds are set are arranged at mutually adjacent positions in one part and also are arranged at positions away from one another in the other part. In this manner, the dense and sparse states fluctuate in the four pixels illustrated in FIG. 13D in which the second lowest thresholds are set. It may be understood from this situation that the dense and sparse states of the pixels in which the lowest thresholds are set which are illustrated in FIG. 13C are substantially uniform, and the dense and sparse states of the pixels illustrated in FIG. 13D in which the second lowest thresholds are set fluctuate.

It should be noted that the extraction of the area 80a in the dither pattern illustrated in FIG. 13B has been described in detail herein, but the respective thresholds are set in the same manner with regard to the entire dither pattern 80 illustrated in FIG. 13A. That is, from the viewpoint of the "low frequency component", the respective thresholds are set in the entire dither pattern 80 such that the low frequency component in the spatial frequency in accordance with the arrangement of the pixels in which the lowest thresholds are set has a lower frequency characteristic than the low frequency component in the spatial frequency characteristic in accordance with the arrangement of the pixels in which the second lowest thresholds are set. From the viewpoint of the "dispersibility", the respective thresholds are set in the entire dither pattern 80 such that the dispersibility of the pixels in which the lowest thresholds are set becomes higher than the dispersibility of the pixels in which the second lowest thresholds are set. From the viewpoint of the "dense and sparse states", the respective thresholds are set in the entire dither pattern such that the dense and sparse states of the pixels in which the lowest thresholds are set are substantially uniform, and the dense and sparse states of the pixels in which the second lowest thresholds are set fluctuate.

As a method of creating the dither pattern 80 illustrated in FIG. 13B described above, a void-and-cluster method described in "Rovert Ulichney, The void-and-cluster method for dither array generation, Proceedings SPIE, Human Vsion, Visual Processing, Digital Displyas IV, vol. 1913, pp. 332-343 (1993)" or the like can be used. According to the void-and-cluster method, first, dots are arranged in a certain area having a certain arbitrary gray scale, and a dot density in each position in the area at this time is determined. Herein, an intensity sum of Gaussian filters is used to evaluate the dot density. Then, a position having a high dot density obtained from the above-described intensity sum is searched for, and a threshold on a lower gray scale side as compared with this gray scale is determined such that the number of the dots is decreased at the position. On the other hand, with regard to a higher gray scale side as compared with this gray scale, a position having a low dot density in the above-described arbitrary gray scale is searched for, and a threshold is determined such that the number of dots is increased at the position. These processes are sequentially respectively performed with respect to the lower gray scale side and the higher gray scale side as compared with the above-described arbitrary gray scale, and the arrangement of the respective thresholds is determined.

In addition, while a rule is satisfied in which four thresholds from among 1 to 64 are arranged and also four thresholds from among 65 to 128 are arranged for every area having a size of 4 pixels×4 pixels, the dither pattern may be set while the respective thresholds are sequentially arranged from the lower thresholds in the entire area having a size of 512 pixels×512 pixels such that the number of low frequency components in the spatial frequency characteristic is low, the dispersibility is low, and the dense and sparse states become substantially uniform in the arrangement of the pixels in which the thresholds 1 to 64 are set as compared with the arrangement of the pixels in which the thresholds 65 to 128 are set.

The dither pattern can also be set while the respective thresholds are sequentially arranged from the lower thresholds with respect to the entire area having a size of 512 pixels×512 pixels. First, a single pixel in which the threshold "1" is set is arranged as a single pixel among 512 pixels×512 pixels. Next, another pixel in which the threshold "1" is set is arranged at a position away from the single pixel in which the threshold "1" is previously set. Next, another pixel in which the threshold "1" is set is arranged at a position away from any one of the two pixels in which the threshold "1" is previously set. In the same manner, another pixel in which the threshold "1" is set is arranged until the number of pixels in which the threshold "1" is set becomes 1024 (=512×512/256) in total in the entire area having a size of 512 pixels×512 pixels. Thereafter, a pixel in which the threshold "2" is set is arranged at a position away from any one of the 1024 pixels in which the threshold "1" is previously set. Next, another pixel in which the threshold "2" is set is arranged at a position away from any one of the 1024 pixels in which the threshold "1" is previously set and the single pixel in which the threshold "2" is previously set. In the same manner, another pixel in which the threshold "2" is set is arranged until the number of pixels in which the threshold "2" is set becomes 1024 in total. The dither pattern may be set to be used in which the thresholds "1" to "256" are set in the same manner in the entire area having a size of 512 pixels×512 pixels while the thresholds are sequentially increased.

Herein, FIGS. 13C and 13D illustrate only the extraction of the area having a size of 4 pixels×4 pixels corresponding to the area 80a of the dither pattern. However, the dither pattern 80 actually has a still larger size of 512 pixels×512 pixels. With reference to FIGS. 14A to 14C, the arrangement of the dots formed in the first pass with respect to the area A2 by using the dither pattern 80 illustrated in FIGS. 13A to 13D will be described. Herein, FIG. 14A illustrates the arrangement of the dots formed by the recording head 102L in the first scanning, and FIG. 14B illustrates the arrangement of the dots formed by the recording head 102R in the first scanning. It should be noted that FIGS. 14A and 14B illustrate a case where both the multi-valued data MuA2_L1 and the multi-valued data MuA2_R1 have a value of "64".

As described with reference to FIGS. 8A, 8B1 and 8B2, 8C1 to 8C4, and 8D1 to 8D8 and FIG. 9, the dither pattern 80 (instead of the dither pattern 70 according to the first exemplary embodiment) is applied to the multi-valued data MuA2_L1 as it is. For this reason, the ejection of the ink is set for the pixels in which the thresholds 1 to 64 are set in the dither pattern 80 in FIG. 14A.

With respect to the multi-valued data MuA2_R1, "64" corresponding to the value of the multi-valued data MuA2_L1 is subtracted from the respective thresholds in the dither pattern 80, and the quantization is performed by using the dither pattern after the subtraction. Therefore, the ejection of the ink is set for the pixels in which the thresholds lower than or equal to "64" are set in the dither pattern after the subtraction, that is, the pixels in which the thresholds "65" to "128" are set in the dither pattern 80 before the subtraction.

As may be understood from the comparison between FIG. 14A and FIG. 14B, the dot arrangement based on the recording head 102R illustrated in FIG. 14B has a relatively low dispersibility. The dot arrangement in a certain area becomes spatially sparse, and the dot arrangement in the other area becomes spatially dense.

On the other hand, the dot arrangement based on the recording head 102L illustrated in FIG. 14A has a relatively high dispersibility, and the spatial dense and sparse states of the dot arrangement are substantially uniform irrespective of areas.

As described above, the dispersibility of the dots can also be evaluated by assessing the spatial frequency characteristic in accordance with the dot arrangement.

FIG. 14C illustrates the power spectrum (solid line part) in the respective frequency areas of the spatial frequency characteristic in accordance with the dot arrangement corresponding to the area A2, the first pass, and the recording head 102L illustrated in FIG. 14A and the power spectrum (broken line part) in the respective frequency areas of the spatial frequency characteristic in accordance with the dot arrangement corresponding to the area A2, the first pass, and the recording head 102R illustrated in FIG. 14B. Herein, the conversion of the dot arrangement based on the binary data illustrated in FIGS. 14A and 14B into the spatial frequency characteristic in accordance with the dot arrangement as illustrated in FIG. 14C is performed in accordance with a method illustrated in "T. Mitsa and K. J. Parker, digital Halftoning using a Blue Noise Mask Proc. SPIE 1452, pp. 47-56 (1991)".

In a case where the dispersibility is high, the spatial frequency characteristic generally indicates a property close to a blue noise characteristic. That is, the number of low frequency components is decreased. Herein, it may be understood with reference to FIG. 14C that the number of low frequency components of the frequency characteristic corresponding to the recording head 102L is decreased as compared with that of the frequency characteristic corresponding to the recording head 102R. In particular, this phenomenon is conspicuous in the frequency area at 0 to 15 [cycle/mm], For this reason, in the frequency area at 0 to 15 [cycle/mm], an integral value (value obtained by integrating the values in the vertical axis by the range of 0 to 15 in the horizontal axis) of the frequency components corresponding to the recording head 102L (power spectrum) is substantially lower than an integral value of the frequency components corresponding to the recording head 102R. it may also be understood from this point that the dispersibility of the dot arrangement based on the recording head 102L becomes higher than that of the dot arrangement based on the recording head 102R, This is because, in the dither pattern 80, the number of low frequency components in the spatial frequency characteristic in accordance with the arrangement of the pixels in which the lowest thresholds (for example, 1 to 64) are set is lower than that of the low frequency components in the spatial frequency characteristic in accordance with the arrangement of the pixels in which the second lowest thresholds (for example, 65 to 128) are set. Since the dither pattern 80 is applied to the multi-valued data MuA2_L1 as it is, the ejection of the ink is sequentially from the pixels in which the lowest thresholds are set in the dither pattern 80. On the other hand, with respect to the multi-valued data MuA2_R1, the ejection of the ink is sequentially from the pixels in which a high threshold to a certain extent (threshold "65" when the value indicated by the multi-valued data MuA2_L1 is 64) is set by the above-described subtraction processing in the dither pattern 80. For this reason, the number of low frequency components in the spatial frequency characteristic in accordance with the dot arrangement corresponding to the area A2, the first pass, and the recording head 102L becomes lower than that of the low frequency components in the spatial frequency characteristic in accordance with the dot arrangement corresponding to the area A2, the first pass, and the recording head 102R (where the dispersibility becomes higher).

When the dither pattern is used in which the number of low frequency components in the spatial frequency characteristic is low in accordance with the pixel arrangement where the above-described low threshold is set, as in the present exemplary embodiment, it is possible to suppress the decrease in the image quality in the overlap recording area A2 where the recording is performed in a distributed manner by a plurality of recording heads. Even in a case where the ejection position deviation is caused in one of the recording heads 102L and 102R in the same scanning, it is possible to suppress an influence of the ejection position deviation.

Figure 15A:
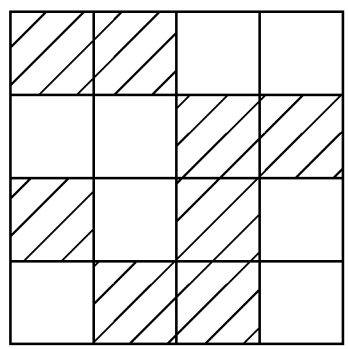
FIGS. 15A to 15C are explanatory diagrams for describing the dot arrangement according to the exemplary embodiment.

FIG. 15A illustrates the dot arrangement when the multi-valued data MuA1_L1 corresponding to the area A1, the first pass, and the recording head 102L and indicating a value of "128" is quantized according to the present exemplary embodiment.

Figure 15B:
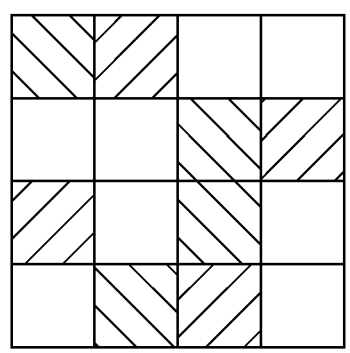

FIG. 15B illustrates the dot arrangement when the multi-valued data MuA2_L1 corresponding to the area A2, the first pass, and the recording head 102L and the multi-valued data MuA2_R1 corresponding to the area A2, the first pass, and the recording head 102R are quantized according to the present exemplary embodiment. Herein, a case is illustrated where both the multi-valued data MuA2_L1 and the multi-valued data MuA2_R1 indicate a value of "64". FIG. 15B illustrates a case where the ejection position deviation is not caused between the recording heads 102L and 102R.

Figure 15C:
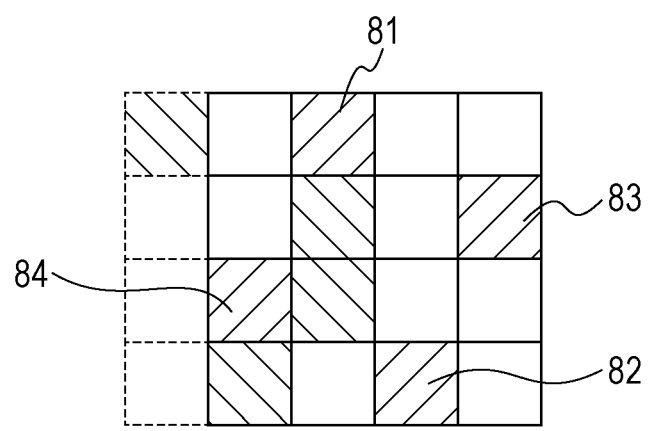

On the other hand, FIG. 15C illustrates the dot arrangement when the multi-valued data MuA2_L1 and the multi-valued data MuA2_R1 are quantized according to the present exemplary embodiment similarly as in FIG. 15B, but FIG. 15C illustrates a case where the ejection position deviation is caused in which the ejection from the recording head 102R is deviated to the left side by one pixel.

It should be noted that pixels with diagonal strokes from the upper right to the lower left indicate the dots formed from the recording head 102L, and pixels with diagonal strokes from the upper left to the lower right indicate the dots formed from the recording head 102R. Herein, for simplicity, only the dot arrangement in the area corresponding to the area 80a in the dither pattern 80 is illustrated in each of the areas A1 and A2.

As may be understood from the comparison between FIG. 15A and FIG. 15B, when the ejection position deviation is not caused between the recording heads, the dot arrangement in the area. A1 and the dot arrangement in the area A2 become the same similarly as in the first exemplary embodiment.

On the other hand, as may be understood from the comparison between FIGS. 15A and 15C that the dot arrangements respectively formed in the area A1 and the area A2 are different from each other in a case where the ejection position deviation is caused in one of the recording heads. Therefore, the image quality is decreased to a certain extent. However, no large difference in the dispersibility of the dots, that is, the fluctuation of the dense and sparse states of the dots is generated between FIG. 15A and FIG. 15C. In this manner, according to the present exemplary embodiment, even when the ejection position deviation is caused in one of the recording heads, a state can be established in which the dispersibility of the dots is not varied so much between the areas A1 and A2, and it is possible to suppress the decrease in the image quality between the areas A1 and A2.

A reason for this is that the number of low frequency components in the spatial frequency characteristic in accordance with the arrangement of the pixels in which the lowest thresholds are set (herein, 1 to 64) is decreased in the dither pattern 80 to increase the dispersibility of those pixels.

Since the quantization is performed with respect to multi-valued data MuA2_R on the basis of the dither pattern 80, the pixels in which the lowest thresholds are set in the dither pattern 80 described above correspond to the pixels in the area A2 where the ejection from the recording head 102L is performed. For this reason, pixels 81, 82, 83, and 84 where the ink is ejected from the recording head 102L to the area A2 have a high dispersibility.

Herein, when only the dots formed by one of the recording heads are observed, even when the ejection position deviation is caused between the recording heads 102L and 102R, the dot arrangement does not change. Therefore, even in a case where the ejection position deviation is caused, the dispersibility of the pixels 81, 82, 83, and 84 where the ink is ejected from the recording head 102L can be maintained to be high according to the present exemplary embodiment. Since the dispersibility of the pixels 81, 82, 83, and 84 is set to be high, even when the ejection position deviation is caused, a difference between the dispersibility of the dot arrangement in the area A2 and the dispersibility of the dot arrangement in the area A1 is not increased.

As a comparison, a case where the dither pattern 70 illustrated in FIGS. 7A to 7D which is used according to the first exemplary embodiment will be described.

Figure 16A:
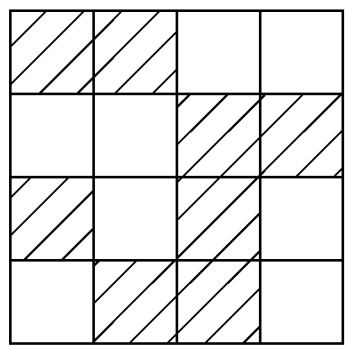
FIGS. 16A to 16C are explanatory diagrams for describing the dot arrangement according to a comparison mode.

FIG. 16A illustrates the dot arrangement when the multi-valued data MuA1_L1 corresponding to the area A1, the first pass, and the recording head 102L and indicating a value of "128" is quantized according to the first exemplary embodiment.

Figure 16B:
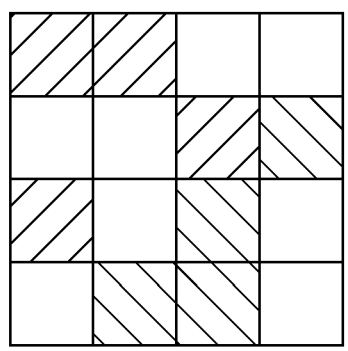

FIG. 16B illustrates the dot arrangement when the multi-valued data MuA2_L1 corresponding to the area A2, the first pass, and the recording head 102L and the multi-valued data MuA2_R1 corresponding to the area A2, the first pass, and the recording head 102R are quantized according to the first exemplary embodiment. Herein, a case is illustrated where both the multi-valued data MuA2_L1 and the multi-valued data MuA2_R1 indicate a value of "64". FIG. 16B illustrates a case where the ejection position deviation is not caused between the recording heads 102L and 102R.

Figure 16C:
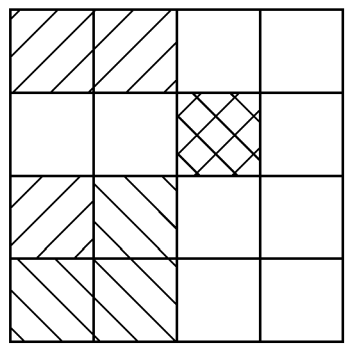

On the other hand, FIG. 16C also illustrates the dot arrangement when the multi-valued data MuA2_L1 and the multi-valued data MuA2_R1 is quantized according to the first exemplary embodiment similarly as in FIG. 16B, but FIG. 16C illustrates a case where the ejection position deviation is caused such that the ejection from the recording head 102R is deviated to the left side by one pixel.

It should be noted that pixels with diagonal strokes from the upper right to the lower left indicate the dots formed from the recording head 102L, and pixels with diagonal strokes from the upper left to the lower right indicate the dots formed from the recording head 102R. Herein, for simplicity, only the dot arrangement in the area corresponding to the area 80a in the dither pattern 80 is illustrated in each of the areas A1 and A2.

In a case where FIG. 16A is compared with FIG. 16B, when the ejection position deviation is not caused between the recording heads, the dot arrangement in the area A1 also becomes the same as the dot arrangement in the area A2 on the basis of the configuration of the first exemplary embodiment.

It should be noted however that, in a case where FIG. 16A is compared with FIG. 16C, when the ejection position deviation is caused in one of the recording heads, it may be understood that there is a fear that the dot arrangements respectively formed in the area A1 and the area A2 are varied, and a large difference in the dispersibility may also be generated. For example, the ejection of the ink is set as a certain amount in the area on the right side of FIG. 16A, but the amount of the ejection of the ink is hardly set in the area on the right side of FIG. 16C, and paper white is conspicuous.

This is because, according to the configuration of the first exemplary embodiment, the dither pattern 70 is designed without particularly taking into account the spatial frequency characteristic. With this configuration, since the dot arrangement corresponding to the area A2, the first pass, and the recording head 102L also has the low dispersibility as in the dot arrangement corresponding to the area A2, the first pass, and the recording head 102R, a local offset is caused.

According to the configuration of the second exemplary embodiment, since the dispersibility in the dot arrangement corresponding to the area A2, the first pass, and the recording head 102L is high, even when the ejection position deviation is caused between the recording heads, the dispersibility can be held with regard to the part where the ejection is performed from the recording head 102L. In contrast to this, according to the configuration of the first exemplary embodiment, since the dispersibility in the dot arrangement corresponding to the area A2, the first pass, and the recording head 102L is low, when the ejection position deviation is caused between the recording heads, the dispersibility is largely decreased. As a result, the difference between the dispersibility is generated between the areas A1 and A2 when the ejection position deviation is caused, and there is a fear that the image quality may be decreased.

In this manner, when the dither pattern 80 illustrated in FIGS. 13A to 13D is used, in addition to the effect similar to that of the configuration of the first exemplary embodiment, it is possible to perform the recording while the decrease in the image quality derived from the ejection position deviation between the recording heads is suppressed.

It should be noted that the dither pattern 80 is used instead of the dither pattern 70 in the configuration of the first exemplary embodiment, and the detail thereof has been described herein. The dither pattern 81 used instead of the dither pattern 71 is also similarly designed as in the dither pattern 80 described above.

Figure 17A:
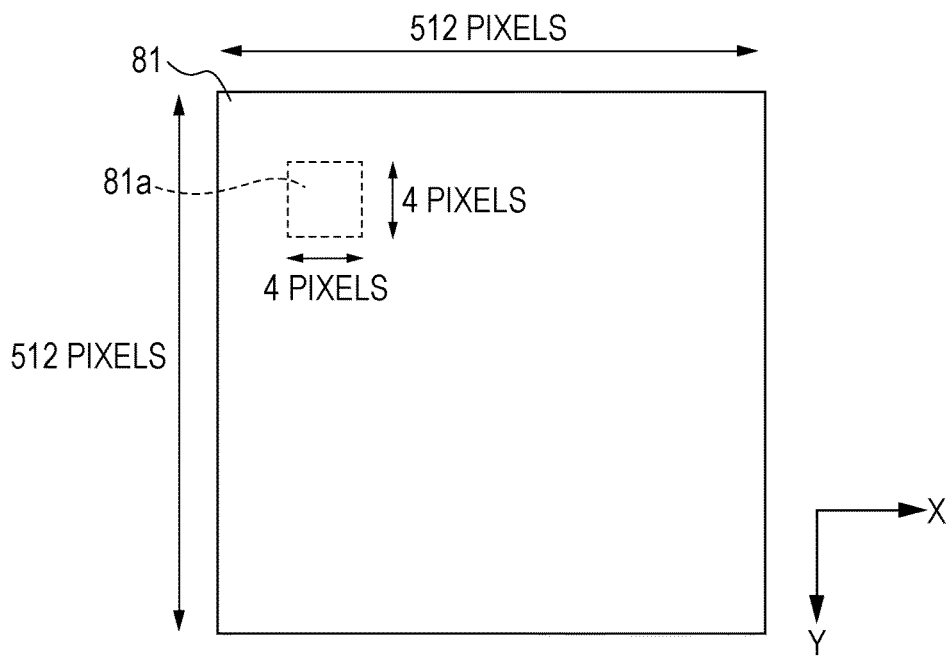

FIGS. 17A to 17D illustrate the dither pattern 81 used instead of the dither pattern 71 according to the present exemplary embodiment. As illustrated in FIG. 17A, the dither pattern 81 used according to the present exemplary embodiment has a size of 512 pixels×512 pixels. It should be noted that, for simplicity, although omitted in FIG. 17A, any one of the thresholds 1 to 256 is set for each of the pixels having a size of 512 pixels×512 pixels in actuality.

FIG. 17B illustrates an extraction of an area 81a having a size of 4 pixels×4 pixels corresponding to a part of the dither pattern having a size of 512 pixels×512 pixels illustrated in FIG. 17A.

In the dither pattern 81 illustrated in FIG. 17A too, similarly as in the dither pattern 80 illustrated in FIG. 13A, the thresholds are set with respect to the respective pixels such that the dispersibility of the pixels in which the lowest thresholds are set becomes higher than the dispersibility of the pixels in which the second lowest thresholds are set. That is, in the dither pattern 81 too, the thresholds are set with respect to the respective pixels such that the number of low frequency components in the spatial frequency characteristic in accordance with the arrangement of the pixels in which the lowest thresholds are set is lower than that of the low frequency components in the spatial frequency characteristic in accordance with the arrangement of the pixels in which the second lowest thresholds are set.

Figure 17C:
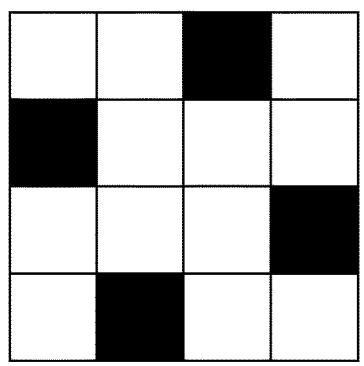
Figure 17D:
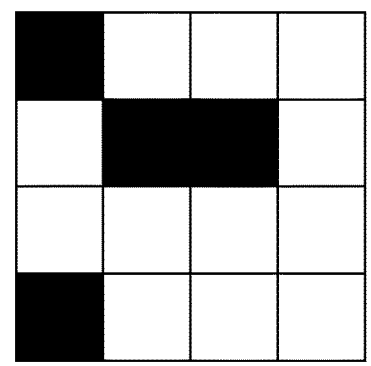

FIG. 17C illustrates four pixels in which the lowest thresholds (herein, 16, 32, 48, and 64) are set which are marked out in black in the area 81a of the dither pattern illustrated in FIG. 17B. FIG. 17D illustrates four pixels in which the second lowest thresholds (herein, 80, 96, 112, and 128) are set which are marked out in black in the area 80a of the dither pattern illustrated in FIG. 17B.

As may be understood from the comparison between FIG. 17C and FIG. 17D, the dispersibility of the pixels in which the lowest thresholds are set illustrated in FIG. 17C is higher than that of the pixels in which the second lowest thresholds are set illustrated in FIG. 17D.

Herein, similarly as in the dither patterns 70 and 71 according to the first exemplary embodiment, the dither patterns 80 and 81 according to the present exemplary embodiment are designed such that the pixels in which thresholds lower than or equal to "128" are set are partially overlapped with each other. In more detail, the thresholds lower than or equal to "128" are set for three pixels including the pixel at the top in the leftmost column, the pixel at the bottom in the second column from the left, and the pixel at the second position from the top in the second column from the right in both the dither patterns 80 and 81. For this reason, for example, when data indicating a value of "128" is input to the respective pixels of the multi-valued data. MuA1_L1 corresponding to the area A1, the first pass, and the recording head 102L and the multi-valued data MuA1_L2 corresponding to the area A1, the second pass, and the recording head 102L, the ink is ejected while being overlapped in both the first pass and the second pass with regard to the above-described three pixels. Therefore, similarly as in the first exemplary embodiment, a difference between the density of the recording image in a case where the ejection position deviation is caused between the first pass and the second pass and the density of the recording image in a case where the ejection position deviation is not caused can be decreased.

In addition, according to the above-described respective exemplary embodiments, the mode has been described in which one of the threshold 1 to 256 is set in each of the pixels in the dither patterns 80 and 81, and the number of low frequency components in the spatial frequency characteristic in accordance with the arrangement of the pixels in which one of the thresholds 1 to 64 is set is lower than the number of low frequency components in the spatial frequency characteristic in accordance with the arrangement of the pixels in which one of the thresholds 65 to 128 is set. However, the implementation can also be carried out on the basis of another mode. A width of the thresholds at which the number of low frequency components is decreased (according to the respective exemplary embodiments, the number of low frequency components is decreased at the thresholds "1" to "64", and a width of the threshold is 64) may be appropriately set as a different width. For example, the number of low frequency components in the spatial frequency characteristic in accordance with the arrangement of the pixels in which one of the thresholds 1 to 32 is set may be lower than the number of low frequency components in the spatial frequency characteristic in accordance with the arrangement of the pixels in which one of the thresholds 33 to 64 is set. In addition, the number of low frequency components in the spatial frequency characteristic in accordance with the arrangement of the pixels in which one of the thresholds 1 to 64 is set may be lower than the number of low frequency components in the spatial frequency characteristic in accordance with the arrangement of the pixels in which one of the thresholds 33 to 96 is set. Moreover, the number of low frequency components in the spatial frequency characteristic in accordance with the arrangement of the pixels in which one of the thresholds 1 to 128 is set may be lower than the number of low frequency components in the spatial frequency characteristic in accordance with the arrangement of the pixels in which one of the thresholds 129 to 256 is set.

In actuality, it is sufficient when the number of low frequency components in the spatial frequency characteristic in accordance with the arrangement of the pixels in which thresholds 1 to j (j is an integer satisfying j>1) are set is lower than the number of low frequency components in the spatial frequency characteristic in accordance with the arrangement of the pixels in which thresholds k to k+j−1 are set. Herein, when the highest value of the thresholds set in the dither pattern is set as M (according to the respective exemplary embodiments, M=256), (1) k≥2 and also (2) k+j−1≤M, that is, 2≤k≤M−j+1 need to be satisfied as conditions for the above-described k. Reasons of the conditions (1) and (2) will be described. First, according to the present exemplary embodiment, since the arrangement in the dither pattern is determined such that the lower thresholds have the higher dispersibility by priority, and the dispersibility of the pixels in which the threshold "1" is set needs to be higher than the dispersibility of the pixels in which another threshold (for example, the threshold "65") is set. For this reason, the number of low frequency components in the spatial frequency characteristic in accordance with the arrangement of the pixels in which thresholds 1 to j are set needs to be lower than the number of low frequency components corresponding to the spatial frequency characteristic in accordance with the arrangement of the pixels in which thresholds k to k+j−1 except for at least the threshold "1" are set. For this reason, the above-described condition (1) is needed. In addition, when the low frequency component at a width of the thresholds k to k+1 is calculated, k+j−1 corresponding to the highest value at the width needs to be lower than or equal to the highest value (M) of the thresholds set in the dither pattern. For this reason, the above-described condition (2) is needed.

It should be noted that the descriptions have been provided while at least k≥2 needs to be satisfied in the above-described condition (1), but in actuality, a value of k is preferably higher. Depending on a size of the dither pattern, a highest value of the thresholds, a diameter of the dots formed on the recording medium, or the like, even in a case where the dispersibility of the pixels in which the threshold "1" is set in the dither pattern is increased to the maximum, there are still cases where the number of gaps in the pixel density in the dither pattern is high. In the above-described case, the dispersibility of the pixels can be sufficiently increased also with regard to the second lowest threshold after "1", that is, the threshold "2", and the dispersibility of the pixels in which the threshold "1" is set is hardly different from the dispersibility of the pixels in which the threshold "2" is set. When this point is taken into account, the above-described value of k is preferably higher than "2" to a certain extent. In actuality, the condition of j≥M/16 is preferably satisfied. According to the respective exemplary embodiments, since M=256 is established, j≥16 is satisfied. This is because, in a case where the dispersibility of the pixels in which the thresholds "1" to "15" are set is increased by priority, when the threshold becomes higher than "16", the dispersibility needs to be decreased.

In a case where the above-described conditions are satisfied, when the values of the input multi-valued data MuA2_L1 and the input multi-valued data MuA2_L2 are at least lower than or equal to j, it is possible to attain the benefit similarly as in the respective exemplary embodiments. It should be noted that in a case where the comparison between the low frequency components is performed, the widths of the thresholds are preferably the same, and under the above-described conditions, the width of the thresholds 1 to j is the same as j−1, and the width of the thresholds k to k+j−1 is also the same as (k+j−1)−k=j−1. In addition, in a case where the comparison between the widths of the continuous thresholds (for example, 1 to 64 and 65 to 128) are performed as described according to the respective exemplary embodiments, it is sufficient when the condition of k=j+1 is satisfied. It should be noted that, in actuality, since the comparison between the low frequency components in accordance with the spatial frequency characteristics in the areas where the widths of the thresholds are not overlapped with each other (for example, the thresholds 1 to 64 and the thresholds 65 to 128, or the thresholds 1 to 64 and the thresholds 193 to 256) is preferably, k>j is preferably satisfied.

In addition, to perform the above-described comparison of the numbers of low frequency components in the spatial frequency characteristic, the number of pixels in which the thresholds 1 to j are set in the dither pattern and the number of pixels in which the thresholds k to k+j−1 are set are preferably the same.

Other Exemplary Embodiments

According to the first and second exemplary embodiments above described, it has been described that it is sufficient when the thresholds lower than "128" are overlapped to a certain extent in the two dither patterns (the dither patterns 70 and 71 according to the first exemplary embodiment, and the dither patterns 80 and 81 according to the second exemplary embodiment). However, in a case where the number of pixels overlapped in the two dither patterns is too high, since the number of dots formed while being overlapped in the first pass and the second pass is increased, there is a fear that the granular impression of the image may be conspicuous.

In view of the above, the two dither patterns preferably satisfy the following condition. When the number of pixels of the two dither patterns is set as A pixels, the number of pixels in which the thresholds lower than or equal to "128" are set in one dither pattern (the dither pattern 70 or the dither pattern 80) is set as B pixels, the number of pixels in which the thresholds lower than or equal to "128" are set in the other dither pattern (the dither pattern 71 or the dither pattern 81) is set as C pixels, and the number of pixels in which the thresholds lower than or equal to "128" are set in both the two dither patterns is set as D pixels, a relation of 0<D<(B×C)/A is preferably satisfied.

In a case where the arrangements of the thresholds in the respective pixels are randomly set in the two dither patterns, a probability that the thresholds lower than or equal to "128" are overlapped with each other is (B/A)×(C/A)=(B×C)/(A×A). That is, when the multi-valued data having the same value is quantized by using the two dither patterns, since the size of the dither pattern is the A pixels, an expectation value of the number of overlapped dots in the areas corresponding to the dither patterns becomes (B×C)/(A×A)×A=(B×C)/A. According to the present exemplary embodiment, the number of pixels D in which the thresholds lower than or equal to "128" are set in both the two dither patterns is preferably lower than (B×C)/A described above. That is, when the number of overlapped dots is lower than that at the time of the random arrangements of the thresholds in the two dither patterns, it is possible to establish a state in which the granular impression is not conspicuous.

On the other hand, when the dots overlapped in the first pass and the second pass are not formed to a certain extent, the decrease in the image quality when the ejection position deviation is caused in the first pass and the second pass described above is not to be suppressed. Therefore, a relation of 0<D<(B×C)/A is preferably satisfied.

It should be noted that the thresholds in which the thresholds lower than or equal to "128" are also set in B, C, and D have been described herein. However, this value may be another value. For example, a case may also be adopted where B, C, and D in the pixels in which the thresholds lower than or equal to "64" are set satisfy the above-described expression. B, C, and D most preferably satisfy the above-described expression in all the 256 values corresponding to "1" to "256".

In addition, according to the respective exemplary embodiments, it has been described that the dither pattern 70' is generated by subtracting the value of the multi-valued data MuA2_L1 from the thresholds in the dither pattern 70, and the multi-valued data MuA2_R1 is quantized by using the dither pattern 70', but the implementation can also be carried out on the basis of another mode.

For example, a configuration may also be adopted in which the value of the multi-valued data MuA2_L1 is added to the value of the multi-valued data MuA2_R1 at the time of the quantization of the multi-valued data MuA2_R1, and the multi-valued data MuA2_R1 after the addition is quantized by using the dither pattern 70. In this case, the ejection of the ink is preferably set with respect to the pixels in which the value of the multi-valued data MuA2_R1 after the addition is higher than or equal to the thresholds in the dither pattern 70 and also the value of the multi-valued data MuA2_R1 before the addition is lower than the thresholds in the dither pattern 70.

When the multi-valued data MuA2_R1 of FIG. 8C3 is taken as an example to be described in detail, the value of the multi-valued data MuA2_R1 before the addition becomes 64, and the value of the multi-valued data MuA2_R1 after the addition becomes 128 (=64+64). Therefore, the recording data BiA2_R1 where the ink is ejected to the pixels in which the thresholds 65 to 128 are set among the dither patterns illustrated in FIGS. 7A to 7D is generated. When the area 70a in the dither pattern illustrated in FIG. 7B is taken as an example, the binary recording data BiA2_R1 where the ejection of the ink is set for the pixels in which the thresholds 80, 96, 112, and 128 that satisfy the above-described conditions is generated, but this is the same as the binary recording data BiA2_R1 generated according to the first exemplary embodiment illustrated in FIG. 8D5.

The case has been described herein in which the multi-valued data MuA2_R1 is processed, the same applies to the case where the multi-valued data MuA2_R2 is processed.

In addition, according to the above-described respective exemplary embodiments, the recording unit has been described in which the recording head 102L and the recording head 102R are arranged to be away from each other to a certain extent, but the distance W for this clearance is preferably longer than at least the distance d between the ejection nozzle arrays in the respective recording heads. It should be noted that the recording time can be shortened as the distance between the recording heads is longer. In actuality, the recording heads are preferably away from each other by the distance at which a desired recording time is obtained.

In addition, according to each of the above-described exemplary embodiments, the configuration has been described in which the respective recording heads use a single ejection nozzle array each for ejecting the cyan ink, the magenta ink, the yellow ink, and the black ink, but a configuration in which an ejection nozzle array for ejecting ink of another color is used may also be adopted. In addition, a configuration may be adopted in which the single recording head is provided with a plurality of ejection nozzle arrays for ejecting the ink of the same color.

Moreover, according to the above-described respective exemplary embodiments, the mode has been described in which the single ejection nozzle array is constituted by the single array including the plurality of ejection nozzles for ejecting the ink of the same type which are arranged in the Y direction, but the implementation can also be carried out on the basis of another mode. For example, the single ejection nozzle array may be constituted in the following manner. Two arrays including the plurality of ejection nozzles for ejecting the ink of the same type which are arranged in the Y direction. The two arrays are at positions shifted from each other in the X direction and are also arranged at positions shifted from each other in the Y direction such that the ejection nozzles in one of the arrays can eject the ink between the ejection nozzles in the other array.

In addition, according to the above-described respective exemplary embodiments, the configuration in which the recording unit constituted by the two different recording heads and the holding unit configured to hold the recording heads is used has been described as the recording unit, but the implementation can also be carried out on the basis of another configuration. That is, it is possible to attain the benefit similarly as in the configurations according to the respective exemplary embodiments when the ejection nozzle arrays are arranged in the respective recording units as described according to the respective exemplary embodiments when the configuration of using the recording unit in which the first recording unit and the second recording unit are arranged to be away from each other in the X direction to a certain extent is adopted. For example, even in a case where a recording unit in which the first recording unit and the second recording unit are arranged in the single recording head without the provision of the holding unit is used, it is possible to attain the benefit similarly as in the configurations according to the respective exemplary embodiments.

Moreover, according to the respective exemplary embodiments, the configuration has been described in which the arrangements of the dots formed in the same scanning in the overlap recording area and the other area become the same, but the arrangements may be varied to a certain extent, for example, by approximately one pixel or two pixels. As a cause for the difference at this time, the data itself to be generated specifies the arrangements of the dots including some difference, or the data specifies the formation of the dots at the same positions, but the arrangements of the dots are varied because of an influence of various landing position deviations. However, when the difference only occurs to a certain extent, it is possible to attain the benefit similarly as in the configurations according to the respective exemplary embodiments.

Furthermore, the "ink" represents liquid as recording agent that may be used for formation of an image, a design, a pattern, or the like when applied onto the recording medium or processing of the recording medium.

The recording apparatus according to the exemplary embodiments of the present invention can suppress both the decrease in the image quality based on the decrease in the granular impression and the uniformity between the overlap recording area and the non-overlap recording area and based the decrease in the image quality on the decrease in the image density among the scanning performed multiple times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-172024, filed Sep. 7, 2017, which is hereby incorporated by reference herein in its entirety.

What is claimed is:

1. A recording apparatus comprising:
a recording unit including a first recording unit having an ejection nozzle array in which a plurality of ejection nozzles for ejecting ink are arranged in a first direction and a second recording unit having an ejection nozzle array in which a plurality of ejection nozzles for ejecting the ink are arranged in the first direction, the second recording unit being arranged at a position away in a second direction intersecting with the first direction from a position where the first recording unit is arranged;
a scanning unit configured to scan the recording unit multiple times in the second direction with respect to a unit area on a recording medium, the unit area including a first area where an image is recorded by using the first recording unit without using the second recording unit and a second area, which is adjacent to the first area in the second direction, where the image is recorded by using both the first recording unit and the second recording unit;
an obtaining unit configured to obtain multi-valued data corresponding to a recording operation onto the unit area by the recording unit;
a generation unit configured to generate recording data for setting ejection or non-ejection of the ink by quantizing the multi-valued data obtained by the obtaining unit by using a plurality of dither patterns in which thresholds for setting ejection or non-ejection of the ink with respect to respective pixels in the unit area are set for the respective pixels; and
a control unit configured to control the recording operation by the recording unit in a manner that the ink is ejected to the unit area on a basis of the recording data generated by the generation unit,
wherein the obtaining unit obtains first multi-valued data corresponding to a first recording operation by the first recording unit with respect to the first area in a first scanning among the multiple scanning operations, second multi-valued data corresponding to a second recording operation by the first recording unit with respect to the second area in the first scanning, third multi-valued data corresponding to a third recording operation by the second recording unit with respect to the second area in the first scanning, fourth multi-valued data corresponding to a fourth recording operation by the first recording unit with respect to the first area in a second scanning different from the first scanning, fifth multi-valued data corresponding to a fifth recording operation by the first recording unit with respect to the second area in the second scanning, and sixth multi-valued data corresponding to a sixth recording operation by the second recording unit with respect to the second area in the second scanning,
wherein the generation unit generates first recording data for setting the ejection of the ink in the first recording operation on a basis of the first multi-valued data and a first dither pattern among the plurality of dither patterns, generates second recording data for setting the ejection of the ink in the second recording on a basis of the second multi-valued data and the first dither pattern, generates third recording data for setting the ejection of the ink in the third recording operation on a basis of the second multi-valued data, the third multi-valued data, and the first dither pattern, generates fourth recording data for setting the ejection of the ink in the fourth recording operation on a basis of the fourth multi-valued data and a second dither pattern among the plurality of dither patterns, fifth recording data for setting the ejection of the ink in the fifth recording operation on a basis of the fifth multi-valued data and the second dither pattern, and sixth recording data for setting the ejection of the ink in the sixth recording operation on a basis of the fifth multi-valued data, the sixth multi-valued data, and the second dither pattern, and wherein an arrangement of thresholds for the respective pixels in the first dither pattern is different from an arrangement of thresholds for the respective pixels in the second dither pattern.

2. The recording apparatus according to claim 1, wherein the unit area further includes a third area, which is adjacent to the second area in the second direction, where the image is recording by using the second recording unit without using the first recording unit, wherein the obtaining unit further obtains seventh multi-valued data corresponding to a seventh recording operation by the second recording unit with respect to the third area in the first scanning and eighth multi-valued data corresponding to an eighth recording operation by the second recording unit with respect to the third area in the second scanning, and wherein the generation unit further generates seventh recording data for setting ejection of the ink in the seventh recording operation on a basis of the seventh multi-valued data and the first dither pattern and further generates eighth recording data for setting ejection of the ink in the eighth recording operation on a basis of the eighth multi-valued data and the second dither pattern.

3. The recording apparatus according to claim 1, wherein the thresholds are set with respect to the respective pixels in a manner that the first dither pattern and the second dither pattern satisfy $0<D<(B\times C)/A$ when the number of pixels in each of the first dither pattern and the second dither pattern is set as A, the number of pixels in which a value lower than a predetermined value is set as the threshold in the first dither pattern is set as B, the number of pixels in which a value lower than the predetermined value is set as the threshold in the second dither pattern is set as C, and the number of pixels in which a value lower than the predetermined value is set as the threshold in both the first dither pattern and the second dither pattern is set as D.

4. The recording apparatus according to claim 1, wherein the thresholds are set with respect to the respective pixels in a manner that the number of low frequency components in a spatial frequency characteristic of the arrangement of the pixels in which values 1 to j (j is an integer satisfying j>1) are set as the thresholds is lower than the number of low frequency components in the spatial frequency characteristic of the arrangement of the pixels in which values k (k is an integer satisfying $2 \leq k \leq M-j+1$ when a highest value of the threshold is set as M) to k+j−1 are set as the thresholds in each of the first dither pattern and the second dither pattern.

5. The recording apparatus according to claim 4, wherein the thresholds are set with respect to the respective pixels in a manner that the number of low frequency components in the spatial frequency characteristic of the arrangement of the pixels in which the values 1 to j are set as the thresholds becomes substantially 0 in each of the first dither pattern and the second dither pattern.

6. The recording apparatus according to claim 4, wherein the thresholds are set with respect to the respective pixels in a manner that the spatial frequency characteristic of the arrangement of the pixels in which the values 1 to j are set as the thresholds has a blue noise characteristic in each of the first dither pattern and the second dither pattern.

7. The recording apparatus according to claim 4, wherein k=j+1 is established.

8. The recording apparatus according to claim 4, wherein $j \geq M/16$ is satisfied.

9. The recording apparatus according to claim 1,
wherein the generation unit performs subtraction processing for subtracting a value indicated by the corresponding pixel of the second multi-valued data from a set threshold with regard to each of the pixels in the first dither pattern and quantizes the third multi-valued data by using the first dither pattern after the subtraction processing to generate the third recording data, and wherein the generation unit performs subtraction processing for subtracting a value indicated by the corresponding pixel of the fifth multi-valued data from a set threshold with regard to each of the pixels in the second dither pattern and quantizes the sixth multi-valued data by using the second dither pattern after the subtraction processing to generate the sixth recording data.

10. The recording apparatus according to claim 1, wherein the generation unit adds a value indicated by the second multi-valued data to a value indicated by the third multi-valued data and quantizes the third multi-valued data after the addition by using the first dither pattern to generate the third recording data, and adds a value indicated by the fifth multi-valued data to a value indicated by the sixth multi-valued data and quantizes the sixth multi-valued data after the addition by using the second dither pattern to generate the sixth recording data.

11. The recording apparatus according to claim 1,
wherein the first recording unit and the second recording unit are mutually different recording heads, and
wherein the recording unit further includes a holding unit configured to hold the first recording unit and the second recording unit.

12. The recording apparatus according to claim 1, wherein the first recording unit and the second recording unit of the recording unit are arranged at the same position in the first direction.

13. The recording apparatus according to claim 1,
wherein the first area is an area including at least one end in the second direction on the recording medium, and
wherein the second area includes at least a central part in the second direction on the recording medium.

* * * * *